US010474330B1

(12) United States Patent
Brookes et al.

(10) Patent No.: US 10,474,330 B1
(45) Date of Patent: Nov. 12, 2019

(54) SUPPLEMENTARY CONTENT LAYERS

(71) Applicant: Amazon Technologies, Inc., Reno, NV (US)

(72) Inventors: Craig R. Brookes, Seattle, WA (US); Joseph King, Seattle, WA (US); Wainwright Gregory Siady Yu, Seattle, WA (US); Charles Conroy Moore, New Castle, WA (US); Andrew Olcott, Seattle, WA (US); Eric Allen Menninga, Seattle, WA (US); Brandon LaBranche Watson, Woodinville, WA (US); Andrew Scott Craft, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 959 days.

(21) Appl. No.: 14/286,861

(22) Filed: May 23, 2014

(51) Int. Cl.
*G06F 3/00* (2006.01)
*G06F 3/0484* (2013.01)
*G06F 17/21* (2006.01)

(52) U.S. Cl.
CPC .......... *G06F 3/0484* (2013.01); *G06F 17/211* (2013.01)

(58) Field of Classification Search
CPC .............................. G06F 3/0484; G06F 17/211
See application file for complete search history.

(56) References Cited

U.S. PATENT DOCUMENTS

| 7,823,070 B2* | 10/2010 | Nelson | G06F 9/4443 715/744 |
| 9,141,257 B1* | 9/2015 | Goldstein | G06F 3/167 |
| 9,288,249 B1* | 3/2016 | Chang | H04L 65/60 |
| 2010/0174783 A1* | 7/2010 | Zarom | G06F 9/526 709/205 |
| 2012/0331402 A1* | 12/2012 | Hon | G06F 17/30058 715/756 |
| 2013/0080881 A1* | 3/2013 | Goodspeed | G06F 17/21 715/251 |
| 2013/0283154 A1* | 10/2013 | Sasakura | G06F 17/217 715/253 |
| 2013/0311870 A1* | 11/2013 | Worsley | G06F 17/30952 715/234 |
| 2014/0150009 A1* | 5/2014 | Sharma | H04N 21/4126 725/28 |
| 2014/0201681 A1* | 7/2014 | Mahaffey | H04M 1/72569 715/846 |
| 2015/0177678 A1* | 6/2015 | Souda | G03G 21/1619 399/107 |

(Continued)

*Primary Examiner* — Stephen S Hong
*Assistant Examiner* — Marshon L Robinson
(74) *Attorney, Agent, or Firm* — Lee & Hayes, P.C.

(57) ABSTRACT

Some implementations include identifying conflicts between multiple layers of supplementary content associated with a digital work (e.g., an electronic book). For individual conflicts between layers of supplementary content at one or more locations within the digital work, conflicts between layers may be resolved in favor of a higher priority layer. Upon resolution of the conflict, information associated with the higher priority layer for supplementing content at a particular location in the digital work may be determined. A visual identifier of the higher priority layer may be displayed along with content associated with the digital work at the particular location.

20 Claims, 23 Drawing Sheets

(56) References Cited

U.S. PATENT DOCUMENTS

2015/0177933 A1* 6/2015 Cueto ............... G06F 3/0483
                                              715/776
2015/0213547 A1* 7/2015 Gomez-Rosado .........................
                                            G06F 3/04817
                                              705/27.2
2016/0048275 A1* 2/2016 Beavers ............. G06F 3/0483
                                              715/202

* cited by examiner

CHAPTER 1. Variation Under Domestication — 102

It has been disputed at what period of life the causes of variability, whatever they may be, generally act; whether during the early or late period of development of the embryo, or at the instant of conception. Geoffroy St. Hilaire's experiments show that unnatural treatment of the embryo causes monstrosities; and monstrosities cannot be separated by any clear line of distinction from mere variations. But I am strongly inclined to suspect that the most frequent cause of variability may be attributed to the male and female reproductive elements having been affected prior to the act of conception. Several reasons make me believe in this; but the chief one is the remarkable effect which confinement or cultivation has on the functions of the reproductive system; this system appearing to be far more susceptible than any other part of the organisation, to the action of any change in the conditions of life. Nothing is more easy than to tame an animal, and few things more difficult than to get it to breed freely under confinement, even in the many cases when the male and female unite. How many animals there are which will not breed, though living long under not very close confinement in their native country! This is generally attributed to vitiated instincts; but how many cultivated plants display the utmost vigour, and yet rarely or never seed! In some few such cases it has been found out that very trifling changes, such as a little more or less water at some particular period of growth, will determine whether or not the plant sets a seed. I cannot here enter on the copious details which I have collected on

118

READING WITH: 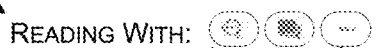

120  122

104

FIG. 17

SUPPLEMENTARY CONTENT LAYERS

BACKGROUND

For a particular type of electronic device, a number of factors may limit the amount of screen space that is available for displaying content. Illustrative examples of such factors may include a size of a display, a size of font associated with the content, or line spacing, among other alternatives.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 10 illustrates another example of a user interface for displaying multiple layers of supplementary content associated with a digital work, according to some implementations.

FIG. 17 illustrates an example user interface in which the user may select to display supplementary content from multiple supplementary commenters, according to some implementations.

DETAILED DESCRIPTION

Figure 1:
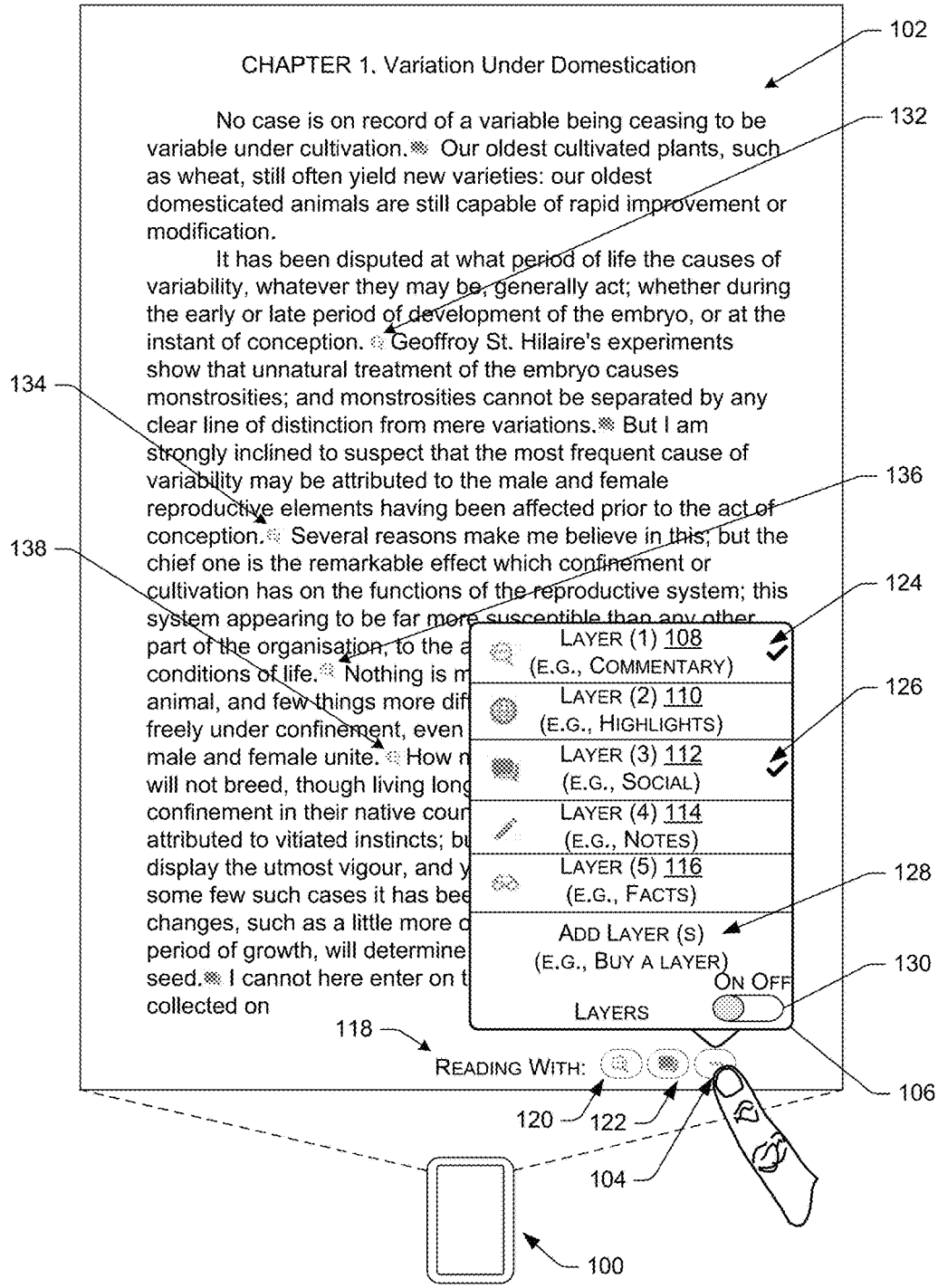
FIG. 1 illustrates an example of a user interface for displaying one or more layers of supplementary content associated with a digital work (e.g., an electronic book), according to some implementations.

This disclosure includes, in part, techniques and arrangements for managing conflicts between "layers" of supplementary content that may be available for a particular digital work (e.g., an electronic book). In some implementations, a layer management experience interface may identify one or more layers that may be available for the particular digital work and allow the user to selectively identify layer(s) of supplementary content for display.

As used herein, the term "layer" refers to content that supplements an original digital work. In some embodiments, the digital work may include an electronic book. However, it will be appreciated that the present disclosure may be applicable to alternative digital works as well (e.g., a digital magazine, etc.). As an illustrative, non-limiting example where the digital work includes an electronic book, a "Commentary" layer may allow a user to view commentary from the author of the electronic book and/or other commenter(s) (e.g., a professor, an expert, etc.). As another example, a "Social" layer may allow the user to see what others (e.g., their friends) are thinking as they read the same electronic book. As another example, a "Facts" layer may allow the user to explore the "bones of the book," helping to find the most important passages and follow important people, places and things in the book. As a further example, a "Notes" layer may help the user to create and organize his or her own notes and add important passages to a virtual notebook that may be stored in memory of an electronic device that is being used to view the electronic book (e.g., a dedicated e-book reader device, among other alternatives). Another example of a layer may include a "Reading Support" layer that may help young readers and other users that are learning English as a second language.

In the present disclosure, the user may activate one or more layers that the user wants to see while viewing/reading the digital work. In some implementations, the layers may be associated with a particular version of an electronic book that is designed to be read on a dedicated e-book reader device or via an electronic book reading application. As an illustrative example, some users may find it useful to read the electronic book the first time with the layers turned off (e.g., reading the electronic book "tabula rasa"). After reading the electronic book with the layers turned off, the user may then find it useful to read the electronic book another time with one or more of the available layers activated in order to identify nuances that the user may have missed during the first reading.

Thus, each "layer" of the present disclosure may provide particular functionality that the user herself may judge for its usefulness in a particular context and selectively activate or deactivate the particular layer. Further, the "layers" structure of the present disclosure may provide the user with a unified and predictable set of user interface controls for features. That is, the "layers" structure of the present disclosure may improve discoverability (among customers who want and are looking for the feature associated with a particular layer) while decreasing frustration (among customers who do not want the feature and want to turn it off). The layers structure of the present disclosure also allows for the addition of new layers features that may be easily identified by the customer.

The present disclosure describes a "layers platform" that may provide a systematic ecosystem-wide user interface (UI) paradigm and technical infrastructure for adding customer-relevant information to supplement book content (i.e., words, images, tables, etc. that are included in a particular book) on the page. Such a systematic ecosystem-wide platform may provide various benefits over building the features of each layer independently. For example, a consistent layers UI paradigm may be better for customers in that a customer may know what to expect with each new layers feature if each of the layers look, feel and behave in substantially the same way. The customer may know where to find the particular layer feature and perhaps more importantly how to control the particular feature (e.g., turn off the layer if it becomes distracting). As another example, a consistent layers UI paradigm may improve feature discovery and adoption. By putting all layers features in a single place, a customer who uses any one of the layers is also exposed to the other layers that are available. Furthermore, because the features of the layers may be similar to one another in both concept and UI, there may not be a steep learning curve when customers move from one layer to another, helping to drive adoption. Further, a common technical infrastructure may help to reduce engineering cost. Abstracting the requirements of individual layers features into a single layers platform may reduce the total engineering cost associated with developing and launching the layers features. That is, the common technical infrastructure represents a single effort to design and build for common layer requirements, while reducing investment of additional resources to those associated with feature-specific requirements.

In some implementations, various criteria may be used to evaluate a particular layers feature. For example, a layers feature may be evaluated based on whether the particular layers feature provides supplementary (as opposed to required) information, provides information that is contextual to book content, provides information that is contextual to geographical dispersed points across the book, provides information that is finite (almost "bite sized") as opposed to infinite, or a combination thereof. To illustrate, annotations made by the author that are not included in the original manuscript may represent an example of providing supplementary as opposed to required information, in contrast to images and tables that are part of the original manuscript of the book. As another example, a book discussion on a particular science fiction book may represent an example of providing information that is contextual to a single book's content, in contrast to a book discussion on the best science fiction books of the year. As a further example, social annotations that are anchored against specific highlighted text, pages or chapters in the book may represent examples of providing information that is geographically dispersed. As another example, "X-Ray" content may represent an example of providing finite (bite-sized) information, in contrast to hyperlinks to webpages. Such "bite-sized" information may reduce distraction from the customer's reading flow. The definition of "bite-sized" may differ between layers data in between words and in between lines (which may be smaller) and on the margin (which may be more extensive). In some cases, layers features may link out of the book from the marginal layer in response to an explicit action from the customer, in order to avoid customers being surprised when they are taken away from the book that they are reading.

Referring to FIG. 1, an example user interface is illustrated that may be presented to a user via an electronic device 100, according to some implementations. In the embodiment illustrated in FIG. 1, the electronic device 100 may present not only content associated with a digital work 102 (e.g., an electronic book) but also supplementary content associated with one or more layers. FIG. 1 illustrates that a user may select a selectable layer control 104 to display a layer management experience interface 106. The layer management experience interface 106 may identify one or more layers that may be available for the particular digital work 102. To illustrate, the user may select one or more layers for display by selecting individual layers via the layer management experience interface 106. Further, in the particular embodiment illustrated in FIG. 1, the layer management experience interface 106 may provide a selectable option for the user to add a layer (e.g., to purchase a layer that is not currently displayed).

In FIG. 1, the selectable layer control 104 is configured to display the layer management experience interface 106 in response to user selection (e.g., by tapping or otherwise selecting an icon that is identified in FIG. 1 as an ellipsis icon). In the embodiment illustrated in FIG. 1, the layer management experience interface 106 includes a plurality of selectable layers. For example, the plurality of layers may include a first layer 108 (identified as "Layer(1)" in FIG. 1), a second layer 110 (identified as "Layer(2)" in FIG. 1), a third layer 112 (identified as "Layer(3)" in FIG. 1), a fourth layer 114 (identified as "Layer(4)" in FIG. 1), and a fifth layer 116 (identified as "Layer(5)" in FIG. 1). FIG. 1 illustrates a particular example in which the first layer 108 may correspond to a "Commentary" layer, the second layer 110 may correspond to a "Highlights" layer, the third layer 112 may correspond to a "Social" layer, the fourth layer 114 may correspond to a "Notes" layer, and the fifth layer 116 may correspond to a "Facts" layer. While FIG. 1 illustrates five layers for the particular digital work 102, an alternative number of layers may be displayed. Further, the ordering of the particular layers in the layer management experience interface 106 illustrated in FIG. 1 is also for illustrative purposes only and represents one possible embodiment.

In some cases, the first layer 108 corresponding to the "Commentary" layer may allow the user to read notes from an author (or other commenter) of the digital work 102 while reading the digital work 102. To illustrate, in the example of FIG. 1, the digital work 102 includes "On the Origin of Species . . . " by Charles Darwin. As such, the "Commentary" layer may allow the user to read notes from one or more commenters (other than the author Charles Darwin) that may represent domain experts (e.g., experts in the fields of evolution, biology, etc.). As another example, a commenter other than the author may include an instructor (e.g., a professor of biology) in order to allow a student to view commentary when completing an assignment associated with the digital work 102.

In some cases, the second layer 110 corresponding to the "Highlights" layer may allow the user to view "popular" highlights associated with the digital work 102. In some cases, the third layer 112 corresponding to the "Social" layer may allow the user to view "social annotations" made by other users when reading the digital work 102. For example, the user may see notes and/or quotations from her friends, followers, and groups while reading. The user may be able to add social annotations such as "comments" or "likes" from within the user interface. In some implementations, "popular" notes, ranked by social indicators such as "comments" and/or "likes" may be displayed when the user has selected to display the third layer 112.

In some cases, the fourth layer 114 corresponding to the "Notes" layer may allow the user to simulate an experience of reading a book and taking notes side by side through the "Notes" layer. For example, the user may add highlights and/or notes to her notebook and may edit and/or organize her notebook without leaving an electronic book reader application. In some cases, the fifth layer 116 corresponding to the "Facts" layer may allow the user to see the most important passages in the book identified on the page, helping readers to pre-read or speed read the book. In some implementations, a map or outline of these important passages may appear in a side panel, allowing the user to quickly find and navigate to the identified passages. Further, while not shown in FIG. 1, another example of a layer may include a "Reading Support" layer to help young readers and other users that are learning English as a second language. For example, the layer may provide simpler English synonyms or short definitions above difficult words on the page, so that the user can focus on understanding the overall narrative rather than agonizing over specific unfamiliar words in the text.

FIG. 1 further illustrates that, in response to user selection of one or more of the layers presented via the layer management experience interface 106, an indicator 118 (e.g., a "Reading With" indication) may be displayed. The indicator 118 may not only provide the user with a visual indication of which particular layers have been selected but may also provide an access point for layer management. To illustrate, in FIG. 1, the "Reading With" area includes a first icon 120 (e.g., a cloud image) that may be displayed in response to user selection of the first layer 108 and a second icon 122 (e.g., a callout image) that may be displayed in response to user selection of the third layer 112. In the particular embodiment illustrated in FIG. 1, the layer management experience interface 106 may display a first icon 124 (e.g., a first checkmark) to indicate that the first layer 108 has been selected and a second icon 126 (e.g., a second checkmark) to indicate that the third layer 112 has been selected. FIG. 1 further illustrates a particular example in which the user may be presented with an option to add another layer associated with the particular digital work 102 by selecting an add layer option 128 via the layer management experience interface 106. In some cases, one or more additional layers available for the particular digital work 102 may include free layers or premium layers available for purchase.

As described further below with respect to FIG. 19, the layer management experience interface 106 also includes a selectable layer deactivation icon 130 that may allow the user to temporarily deactivate the selected layer(s). That is, the currently selected layer(s) may remain selected in the layer management experience interface 106, but one or more visual representations associated with the selected layer(s) may be removed such that the digital work 102 may be displayed without overlying content. FIG. 1 further illustrates that the layer management experience interface 106 may identify an "anchor identifier" icon (e.g., a glyph, a tick mark, etc.) associated with the individual layers. As illustrative non-limiting examples, a cloud image may be associated with the first layer 108, a globe image may be associated with the second layer 110, a callout image may be associated with the third layer 112, a pencil image may be associated with the fourth layer 114, and a reading glasses image may be associated the fifth layer 116. While FIG. 1 illustrates a particular example in which the digital work 102 includes text, the present disclosure may also include various types of content, including multimedia.

Figure 2:
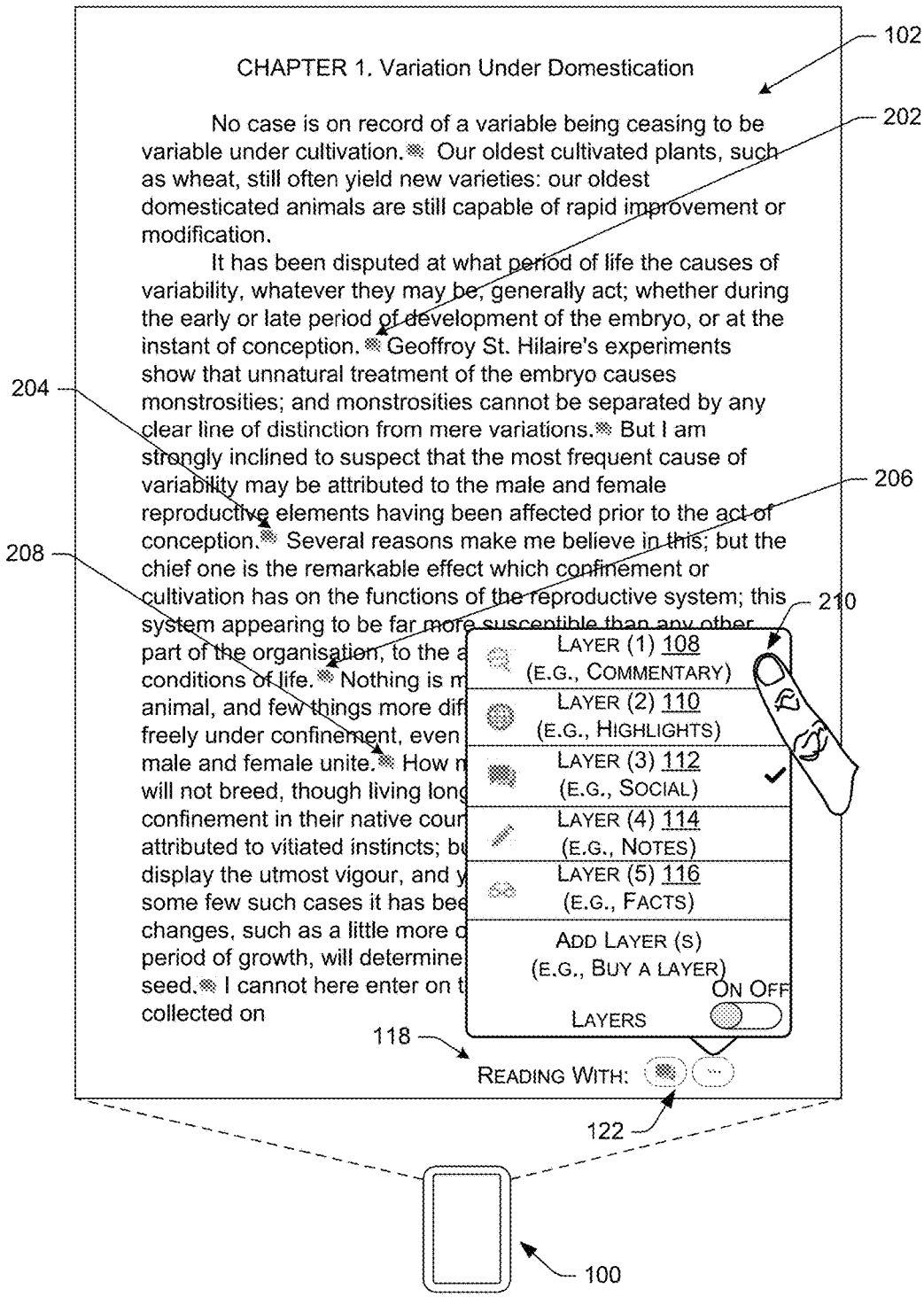
FIG. 2 illustrates an example of the user interface of FIG. 1 after the user has selectively removed a particular layer via the layer management experience interface.

FIGS. 1 and 2 illustrate that, in some embodiments, layer conflicts may be resolved based at least in part on which particular layer represents a higher priority layer. For example, in some cases, priorities may be user-specific. To illustrate, a priority may be determined by passively monitoring a user's past interactions (e.g., what layers the user uses most often, how the user has resolved conflicts in the past by turning a particular layer on/off, etc.), a user's configuration settings, or a parental control setting, among other alternatives. For illustrative purposes, FIG. 1 shows that multiple anchor point identifiers may be associated with the digital work 102. In some cases, an anchor point may be a metadata flag that associates a particular piece of content to a note. In some cases, a particular location for display of an indicator may be represented in terms of pixels of the display (e.g., within X number of pixels of a period at the end of a sentence or within Y number of pixels of a particular word within a sentence). In FIG. 1, a first anchor point identifier 132 is represented as the cloud image associated with the first layer 108 at the end of the sentence "It has been disputed at what period of life the causes of variability, whatever they may be, generally act; whether during the early or late period of development of the embryo, or at the instant of conception." FIG. 1 further illustrates that a second anchor point identifier 134, a third anchor point identifier 136, and a fourth anchor point identifier 138 are each represented as the cloud image associated with the first layer 108.

By contrast, referring to FIG. 2, in response to the user selectively removing the first layer 108 via the layer management experience interface 106, the cloud image associated with the first anchor point identifier 132 of FIG. 1 may be replaced with the callout image associated with the third layer 112 (as shown at 202). Similarly, FIG. 2 illustrates that the cloud images associated with the second anchor point identifier 134, the third anchor point identifier 136, and the fourth anchor point identifier 138 of FIG. 1 may be replaced with the callout image associated with the third layer 112, as shown at 204, 206 and 208, respectively. FIG. 2 further illustrates that the first icon 124 of FIG. 1 (e.g., the first checkmark) may be removed to indicate that the first layer 108 has been de-selected, as shown at 210.

Thus, FIGS. 1 and 2 illustrate a particular embodiment in which the first layer 108 represents a higher priority layer compared to the third layer 112. As such, when a conflict exists at a particular location within the digital work 102 (e.g., at a particular word address or character address associated with one or more words, sentences, paragraphs, byte numbers, etc.), the conflict may be resolved in favor of the higher priority layer. That is, the cloud image that represents an anchor point identifier for the first layer 108 may be presented when the first layer 108 is "on" (see e.g., FIG. 1) while the callout image that represents an anchor point identifier for the third layer 112 may be presented when the first layer 108 is not "on" (see e.g., FIG. 2). Further, FIG. 1 illustrates a framework that is expandable in order to allow for new layers (e.g., features) to be added via the layer management experience interface 106. Alternative conflict resolution methods and associated user interfaces are further described below.

Figure 3:
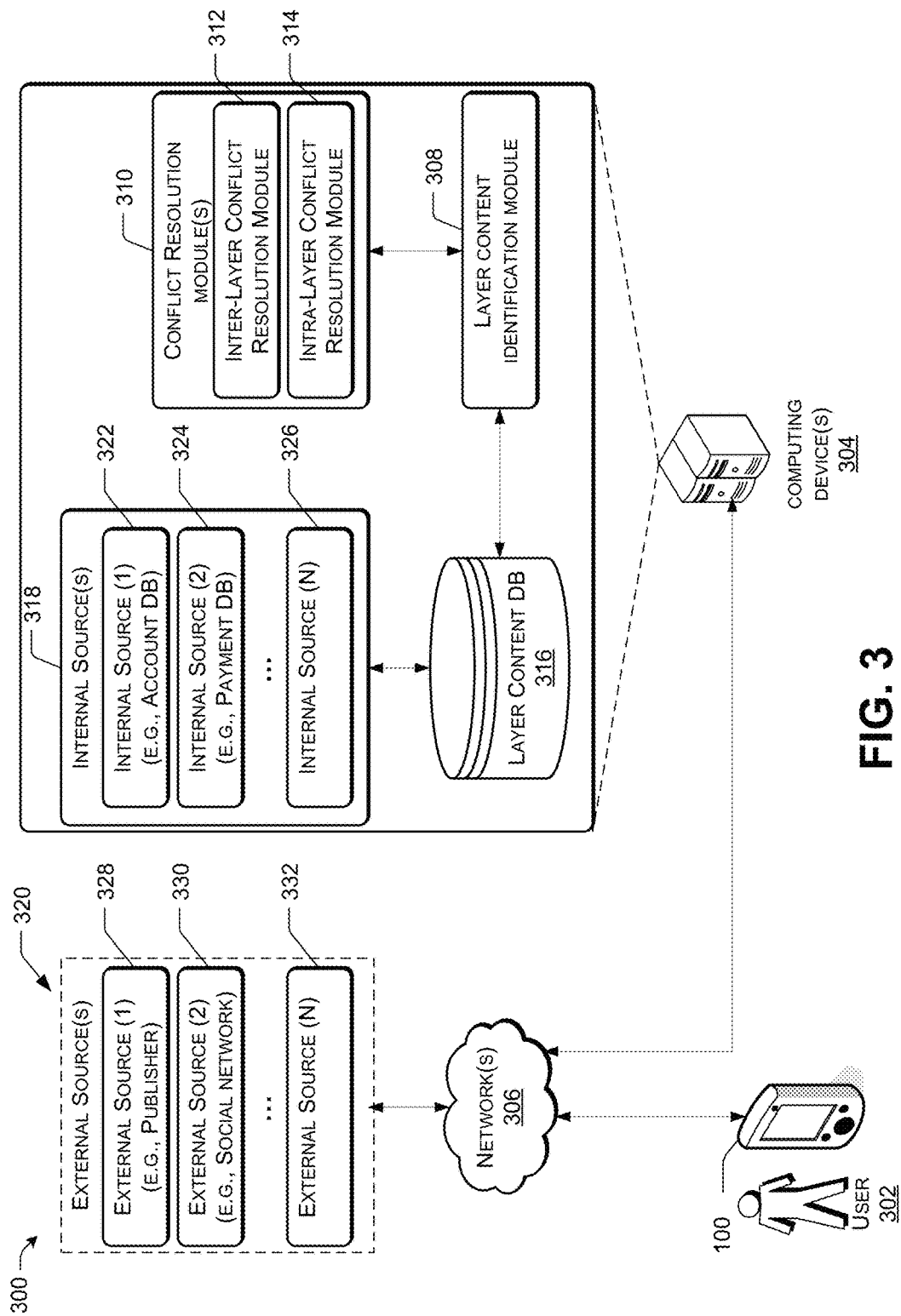
FIG. 3 illustrates an example of a framework for managing supplementary content, according to some implementations.

FIG. 3 illustrates an example framework 300 for providing supplementary content associated with one or more layers and resolving conflict(s) between one or more layers, according to some implementations. FIG. 3 shows illustrative interactions between the electronic device 100, a user 302, and a remote system (illustrated as one or more remote computing devices 304) when performing various operations. The one or more remote computing devices 304 may act as a "hub" to gather data from internal and/or external sources, acting as a gateway to the electronic device 100. For example, the one or more remote computing devices 304 may be able to access account profiles to determine whether a particular user has paid and/or whether the particular user is entitled to certain levels of layer access.

The electronic device 100 may correspond to a wide variety of electronic devices. In some embodiments, the electronic device 100 may be a computing device that includes one or more processors and a memory that may contain software applications executed by the processors (see e.g., the computing device 2000 of FIG. 20). Software of the electronic device 100 may include components for establishing communications over wireless or wired communication networks or directly with other computing devices. In FIG. 3, the electronic device 100 may communicate with the one or more computing devices 304 via one or more networks 306. For example, the electronic device 100 may include one or more communication interfaces (see e.g., the electronic device 2000 of FIG. 20) to communicate with the one or more computing devices 304. In some cases, the electronic device 100 may have access to the Internet via a wired or wireless connection, such as via a WiFi connection or via a cellular telephone network (e.g., a Long Term Evolution or LTE network), among other alternatives (e.g., Bluetooth®).

The network 306 may be a publicly accessible network of linked networks, possibly operated by various distinct parties, such as the Internet. In other embodiments, the network 306 may include a private network, personal area network ("PAN"), LAN, WAN, cable network, satellite network, etc. or some combination thereof, each with access to and/or from the Internet. For example, the one or more computing devices 304 may be located within a single data center, and may communicate via a private network as described above.

In the embodiment illustrated in FIG. 3, the one or more computing devices 304 include a layer content identification module 308 and one or more conflict resolution modules 310. For example, the one or more conflict resolution modules 310 may include an inter-layer conflict resolution module 312 and an intra-layer conflict resolution module 314. The one or more computing devices 304 also include a layer content database 316.

The layer content database 316 may be configured to receive supplementary content information (e.g., "layer" information) from various sources. For example, the layer content database 316 may receive information from one or more internal sources 318 and/or one or more external sources 320 (e.g., via the network 306). For example, in the embodiment illustrated in FIG. 3, the one or more internal sources 318 include N internal sources, including a first internal source 322 (identified as "Internal Source (1)" in FIG. 3), a second internal source 324 (identified as "Internal Source (2)" in FIG. 3), and an Nth internal source 326 (identified as "Internal Source(N") in FIG. 3).

As an illustrative example, the first internal source 322 may represent an account database that includes information associated with a plurality of customers. As another example, the second internal source 324 may represent a payment database that includes information associated with processing payment from one or more customers.

Further, in the embodiment illustrated in FIG. 3, the one or more external sources 320 include N external sources, including a first external source 328 (identified as "External Source (1)" in FIG. 3), a second external source 330 (identified as "External Source (2)" in FIG. 3), and an Nth external source 332 (identified as "External Source(N") in FIG. 3).

To illustrate, the first external source 328 may correspond to a publisher of the digital work 102. In some cases, information associated with author commentary or commentary from one or more other commenters (e.g., supplementary content associated with the first layer 108) may be received from the first external source 328. As another example, the second external source 330 may correspond to at least one social network source. In some cases, social annotations (e.g., supplementary content associated with the third layer 112) may be received from the second external source 330.

In some embodiments, determining how to resolve a conflict between one or more layers may include correlating a score from a particular layer with a score from a different layer (for comparison and ranking of layers). That is, one or more algorithms may be used to translate a data point in one layer to a data point in another layer (e.g., an "apples to apples" comparison). In some embodiments, conflicts between layers may be resolved by providing the user with an option to "control the volume" at the layer level (e.g., one customer scores "Social Commentary" to be more important than "Author Notes").

In some embodiments, resolving conflicts may include determining how frequently data for a particular layer appears in the digital work 102. As an illustrative example, "popular" highlights associated with the second layer 110 may appear a limited number of times in a particular book (e.g., ten times). Accordingly, each "popular" highlight may be more "valuable" to a reader than individual social comments, of which there may be many.

In some embodiments, resolving conflicts may include determining whether data from a particular layer is repetitive within the digital work 102. For example, a "hard" word in a "Reading Support" layer may appear more than one time in a book, so removing the word in one location may not result in removal throughout the book.

In some embodiments, resolving conflicts may include determining a priority by source. To illustrate, personal content may rank above third-party content, and some types of third-party content (e.g., author notes) may rank above other types of third-party content (e.g., non-author notes).

In some embodiments, "upvotes" may be used for layers with crowdsourced data. As an illustrative, non-limiting example, assuming one "like" for a social annotation equals one "upvote" for an authored note, then a social annotation with two "likes" may rank higher than an authored note with one "upvote."

In some embodiments, a priority may determined based on one or more customer characteristics or previous behavior(s). To illustrate, this may be a fixed priority, or a machine learning model may learn a customer's preferences over time. In some embodiments, priority may be based on a customer setting.

Figure 4:
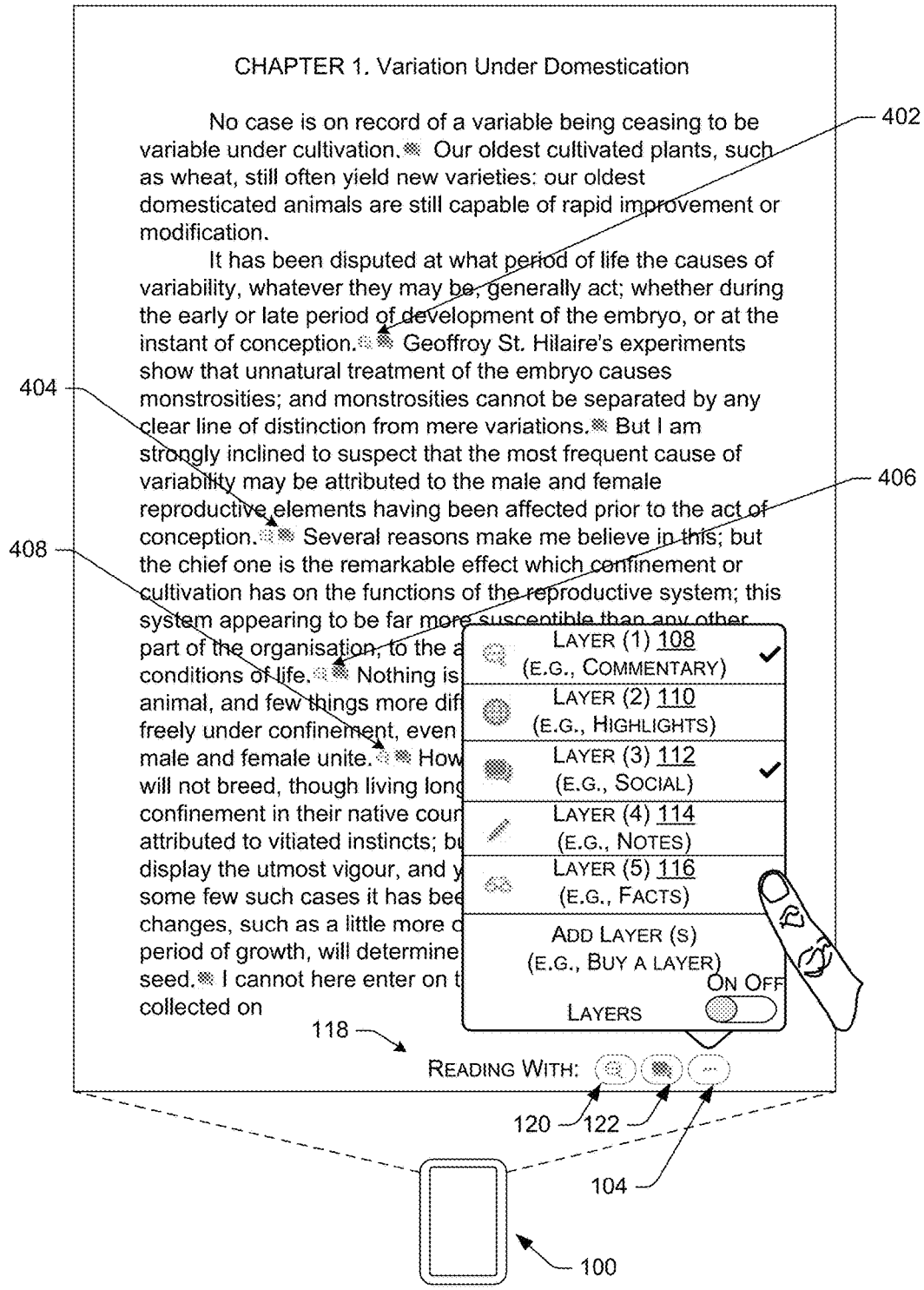
FIG. 4 illustrates another example of a user interface for displaying multiple layers of supplementary content associated with a digital work, according to some implementations.

FIG. 4 illustrates an alternative example in which multiple glyphs may be shown at a particular location (e.g., an anchor point). One or more thresholds may be used to determine whether to stop showing all of the glyphs or whether to show only a subset of the glyphs associated with the particular location. In some cases, a first threshold may include 2 or 3 glyphs to be represented side by side, while a second threshold may include 4 or more glyphs. In the case of 4 or more glyphs, the multiple glyphs may be consolidated to reduce the potential distraction to the user. For example, in some cases, a single glyph representing the highest priority layer may be presented. In other cases, an ellipsis may be presented to indicate to the user that multiple layers are associated with the same anchor point, and the user may select the ellipsis to display supplementary content for one or more of the available layers. As an alternative example, a glyph representing the highest priority layer may be presented along with an ellipsis.

In the example of FIG. 4, two glyphs are presented side by side at the four illustrative anchor point locations, as shown at 402, 404, 406 and 408. That is, the cloud glyph associated with the first layer 108 may represent the higher priority layer and may be presented as the first glyph in the reading sequence (e.g., to the left of the callout glyph associated with the third layer 112).

Figure 5:
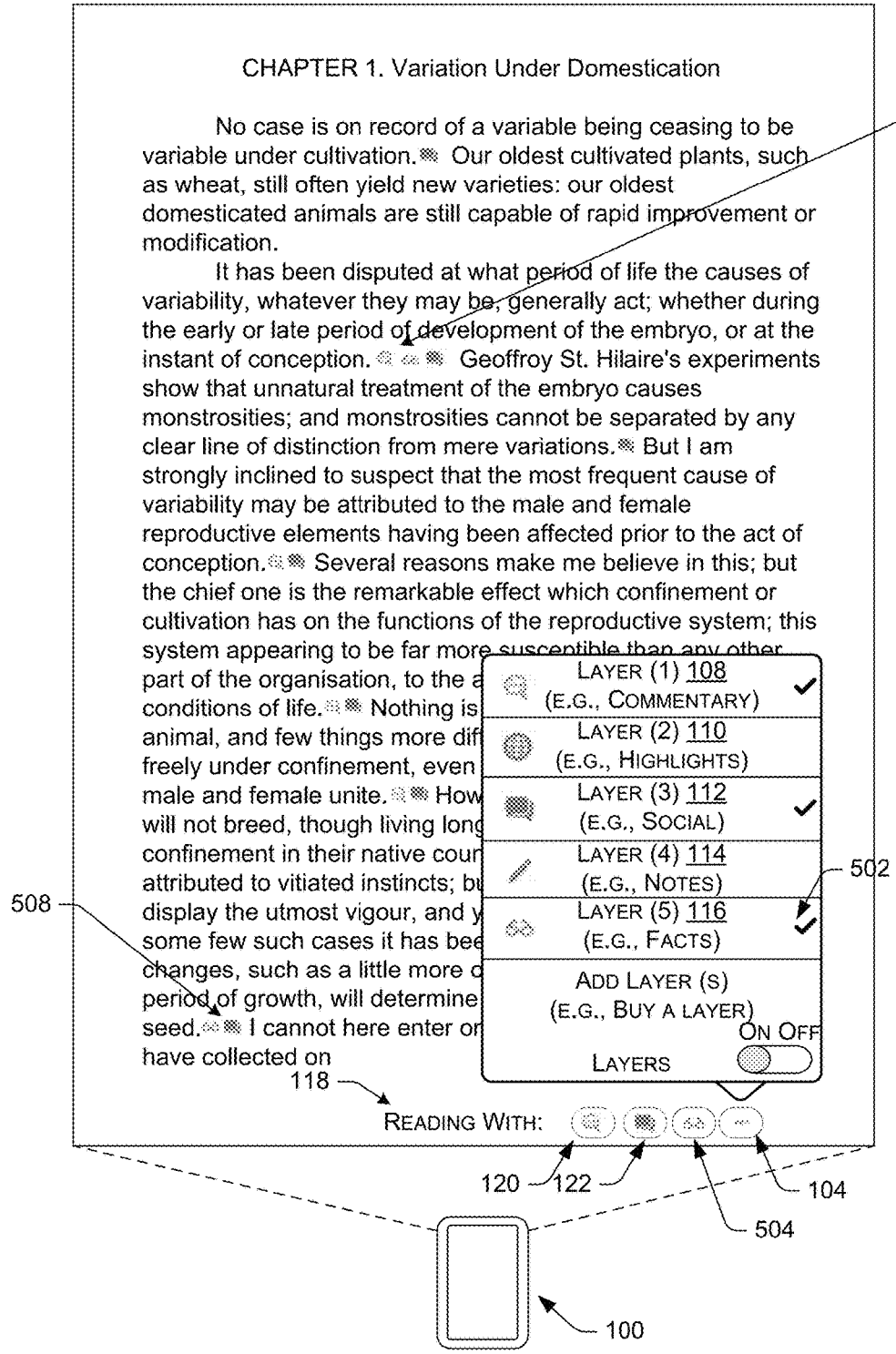
FIG. 5 illustrates another example of a user interface for displaying multiple layers of supplementary content associated with a digital work, according to some implementations.

Referring to FIG. 5, an example of the user adding another layer via the layer management experience interface 106 is illustrated. In the example of FIG. 5, a third checkmark may be added to indicate that the fifth layer 116 (e.g., the "Facts" layer) has been selected, as shown at 502. FIG. 5 further illustrates that a third icon 504 (e.g., a reading glasses image) may be displayed in response to user selection of the fifth layer 116. As such, in the example of FIG. 5, the "Reading With" area 118 includes the first icon 120 (e.g., the cloud image) associated with the first layer 108, the second icon 122 (e.g., the callout image) associated with the third layer 112, and the third icon 504 (e.g., the reading glasses image) associated with the fifth layer 116.

FIG. 5 illustrates a particular example in which the ordering of the icons presented in the "Reading With" area 118 may be determined based on an order of selection by the user and may not reflect the priority of the particular selected layers. That is, the user may have first selected the first layer 108 via the layer management experience interface 106, followed by the third layer 112 (see e.g., FIG. 1), followed by the fifth layer 116 (as shown in FIG. 5). In some embodiments, the selectable layer control 104 may be displayed in a lower right corner of the display, and the selected layers may be presented to the left of the selectable layer control 104 upon selection. In this case, subsequent layers may be presented in sequence according to an order of selection, resulting in the previously selected layers being shifted further away from the selectable layer control 104 (e.g., further to the left). As an example of an alternative embodiment, the selectable layer control 104 may be displayed in a lower left corner of the display, and the selected layers may be presented to the right of the selectable layer control 104 upon selection.

To illustrate, referring to the example of FIG. 5, in response to the user selecting the first layer 108 via the layer management experience interface 106, the first icon 120 (e.g., the cloud image) associated with the first layer 108 may be presented adjacent to (e.g., to the left of) the selectable layer control 104. In response to the user selecting the third layer 112 via the layer management experience interface 106, the second icon 122 (e.g., the callout image) associated with the third layer 108 may be presented adjacent to (e.g., to the left of) the selectable layer control 104. The first icon 120 (e.g., the cloud image) associated with the first layer 108 may be shifted further away from the selectable layer control 104 (e.g., further to the left). In response to the user selecting the fifth layer 116 via the layer management experience interface 106, the third icon 504 (e.g., the reading glasses image) associated with the fifth layer 116 may be presented adjacent to (e.g., to the left of) the selectable layer control 104. The first icon 120 (e.g., the cloud image) associated with the first layer 108 and the second icon 122 (e.g., the callout image) may both be shifted further away from the selectable layer control 104 (e.g., further to the left).

FIG. 5 further illustrates that, in response to the user selectively adding the fifth layer 116 via the layer management experience interface 106, the reading glasses image may be added side by side to the cloud image and the callout image at a first anchor point, as shown at 506. In the example illustrated in FIG. 5, the fifth layer 116 may represent a lower priority layer than the first layer 108 but may represent a higher priority layer than the third layer 112. As such, referring to the anchor point identified at 506, the cloud glyph associated with the first layer 108 may be presented as the first glyph in the reading sequence, followed by the reading glasses glyph associated with the fifth layer 116, followed by the callout glyph associated with the third layer 112. As another example, referring to the anchor point identified at 508, the reading glasses glyph associated with the fifth layer 116 may be presented as the first glyph in the reading sequence, followed by the callout glyph associated with the third layer 112.

Thus, FIG. 5 illustrates a particular example in which the ordering of the icons displayed in the "Reading With" area 118 may be determined based on an order of selection by the user and may not reflect the priority of the particular selected layers. However, FIG. 5 also illustrates an example in which the ordering of the images displayed within the digital work 102 at the various anchor points may reflect the priority of the selected layers and may be dynamically updated depending on the particular layers that are currently selected.

Figure 6:
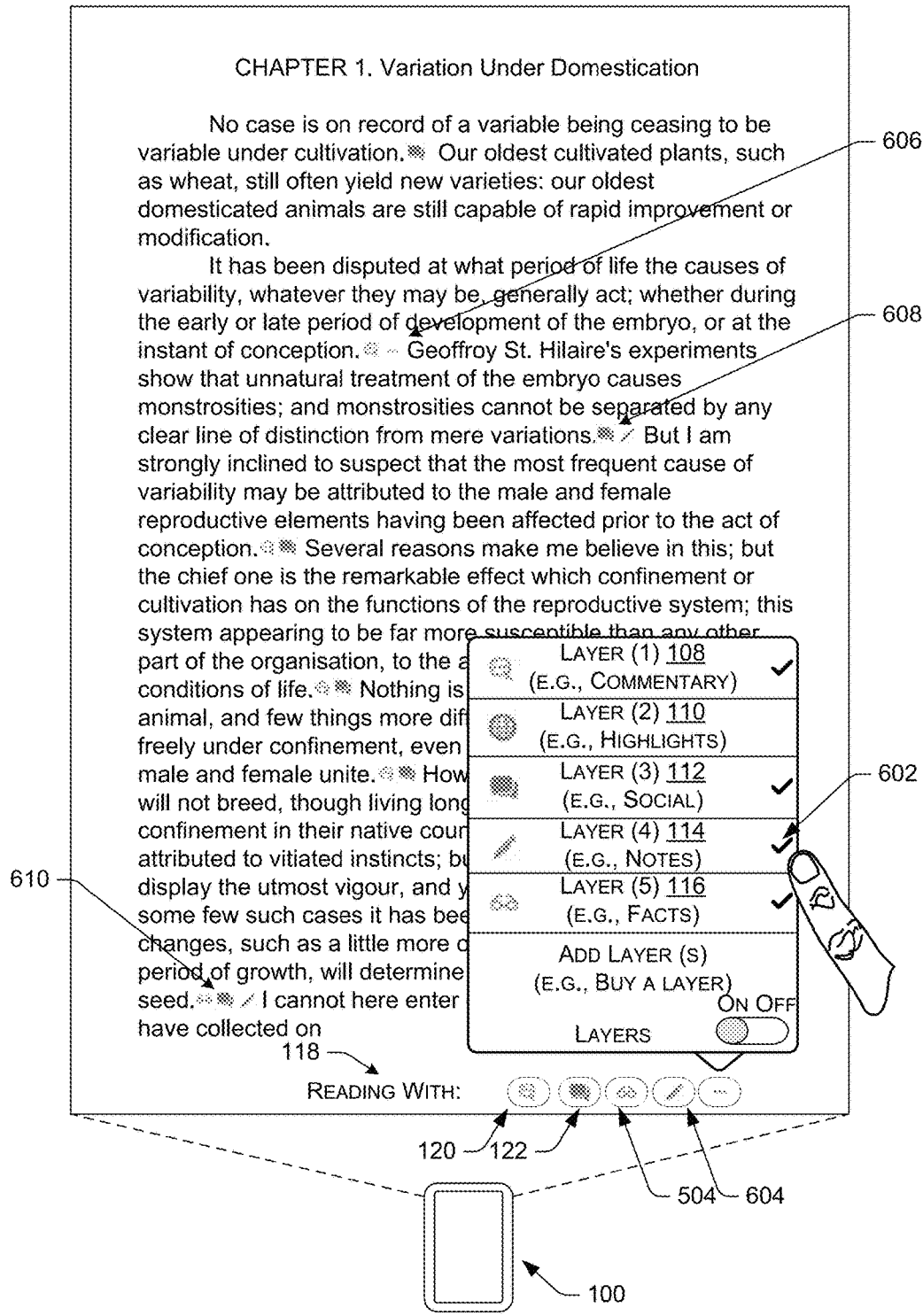
FIG. 6 illustrates another example of a user interface for displaying multiple layers of supplementary content associated with a digital work, according to some implementations.

Referring to FIG. 6, an example of the user adding another layer via the layer management experience interface 106 is illustrated. In the example of FIG. 6, a fourth checkmark may be added to indicate that the fourth layer 114 (e.g., the "Notes" layer) has been selected, as shown at 602. FIG. 6 further illustrates that a fourth icon 604 (e.g., a pencil image) may be displayed in response to user selection of the fourth layer 114. As such, in the example of FIG. 6, the "Reading With" area 118 includes the first icon 120 (e.g., the cloud image) associated with the first layer 108, the second icon 122 (e.g., the callout image) associated with the third layer 112, the third icon 504 (e.g., the reading glasses image) associated with the fifth layer 116, and the fourth icon 604 (e.g., the pencil image) associated with the fourth layer 114.

FIG. 6 illustrates a particular example in which the ordering of the icons presented in the "Reading With" area 118 may be determined based on an order of selection by the user and may not reflect the priority of the particular selected layers. That is, the user may have first selected the first layer 108 via the layer management experience interface 106, followed by the third layer 112 (see e.g., FIG. 1), followed by the fifth layer 116 (see e.g., FIG. 5), followed by the fourth layer 114. In the embodiment illustrated in FIG. 6, the selectable layer control 104 is displayed in the lower right corner of the display, and the selected layers are presented to the left of the selectable layer control 104 upon selection.

In response to the user selecting the fourth layer 114 via the layer management experience interface 106, the fourth icon 604 (e.g., the pencil image) associated with the fourth layer 116 may be presented adjacent to (e.g., to the left of) the selectable layer control 104. The first icon 120 (e.g., the cloud image) associated with the first layer 108, the second icon 122 (e.g., the callout image), and the third icon 504 (e.g., the reading glasses image) may each be shifted further away from the selectable layer control 104 (e.g., further to the left).

FIG. 6 further illustrates a particular embodiment in which supplementary content associated with the fourth layer 114 may also be associated with the first anchor point. That is, the supplementary content associated with the fourth layer 114 may represent the fourth layer of supplementary content associated with the first anchor point. In some cases, a threshold number of layers (e.g., three as shown in FIG. 5) may be allowed for a particular anchor point, after which the user may become distracted. Accordingly, FIG. 6 illustrates a particular example in which an ellipsis may be added adjacent to the cloud image (e.g., the highest priority layer) at the first anchor point, as shown at 606.

FIG. 6 further illustrates that, in response to the user selectively adding the fourth layer 114 via the layer management experience interface 106, the pencil image may be added side by side to the callout image at an anchor point, as shown at 608. In the example illustrated in FIG. 6, the fourth layer 114 may represent a lower priority layer than both the third layer 112 and the fifth layer 116. As such, referring to the anchor point identified at 608, the callout glyph associated with the third layer 112 may be presented as the first glyph in the reading sequence, followed by the pencil glyph associated with the fourth layer 114. As another example, referring to the anchor point identified at 610, the reading glasses glyph associated with the fifth layer 116 may be presented as the first glyph in the reading sequence, followed by the callout glyph associated with the third layer 112, followed by the pencil glyph associated with the fourth layer 114.

Thus, FIG. 6 illustrates another example in which the ordering of the icons displayed in the "Reading With" area 118 may be determined based on an order of selection by the user and may not reflect the priority of the particular selected layers. However, FIG. 6 also illustrates another example in which the ordering of the images displayed within the digital work 102 at the various anchor points may reflect the priority of the selected layers and may be dynamically updated depending on the particular layers that are currently selected.

Figure 7:
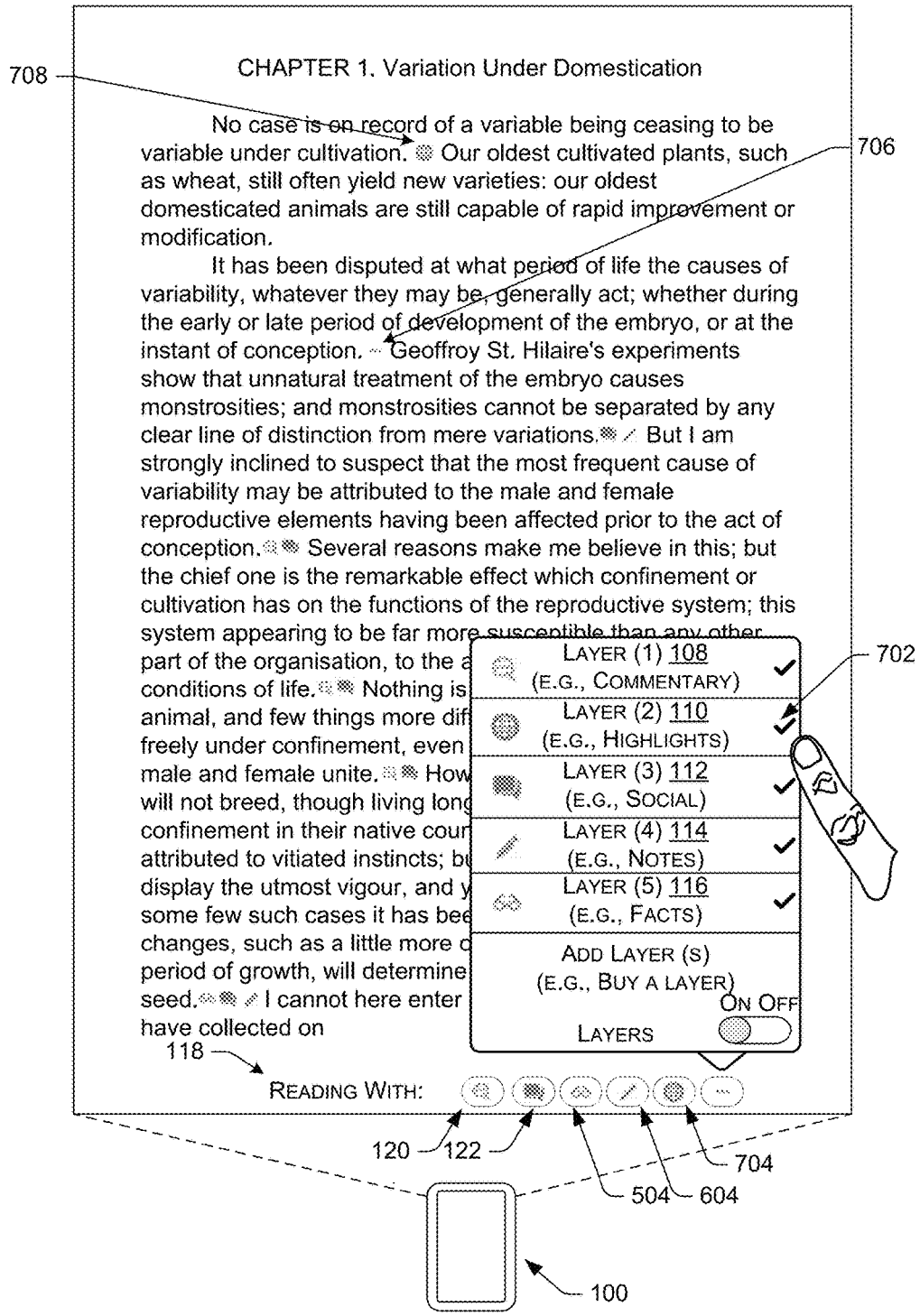
FIG. 7 illustrates another example of a user interface for displaying multiple layers of supplementary content associated with a digital work, according to some implementations.

Referring to FIG. 7, an example of the user adding another layer via the layer management experience interface 106 is illustrated. In the example of FIG. 7, a fifth checkmark may be added to indicate that the second layer 110 (e.g., the "Highlights" layer) has been selected, as shown at 702. FIG. 7 further illustrates that a fifth icon 704 (e.g., a globe image) may be displayed in response to user selection of the second layer 110. As such, in the example of FIG. 7, the "Reading With" area 118 includes the first icon 120 (e.g., the cloud image) associated with the first layer 108, the second icon 122 (e.g., the callout image) associated with the third layer 112, the third icon 504 (e.g., the reading glasses image) associated with the fifth layer 116, the fourth icon 604 (e.g., the pencil image) associated with the fourth layer 114, and the fifth icon 704 (e.g., the globe image) associated with the second layer 110.

FIG. 7 illustrates another example in which the ordering of the icons presented in the "Reading With" area 118 may be determined based on an order of selection by the user and may not reflect the priority of the particular selected layers. That is, the user may have first selected the first layer 108 via the layer management experience interface 106, followed by the third layer 112 (see e.g., FIG. 1), followed by the fifth layer 116 (see e.g., FIG. 5), followed by the fourth layer 114 (see e.g., FIG. 6), followed by the second layer 110. In the embodiment illustrated in FIG. 7, the selectable layer control 104 is displayed in the lower right corner of the display, and the selected layers are presented to the left of the selectable layer control 104 upon selection.

In response to the user selecting the second layer 110 via the layer management experience interface 106, the fifth icon 704 (e.g., the globe image) associated with the second layer 110 may be presented adjacent to (e.g., to the left of) the selectable layer control 104. The first icon 120 (e.g., the cloud image) associated with the first layer 108, the second icon 122 (e.g., the callout image), the third icon 504 (e.g., the reading glasses image), and the fourth icon 604 (e.g., the pencil image) may each be shifted further away from the selectable layer control 104 (e.g., further to the left).

FIG. 7 further illustrates a particular embodiment in which supplementary content associated with the second layer 110 may also be associated with the first anchor point. That is, the supplementary content associated with the second layer 110 may represent the fifth layer of supplementary content associated with the first anchor point. In some cases, a threshold number of layers (e.g., three as shown in FIG. 5) may be allowed for a particular anchor point, after which the user may become distracted. Accordingly, FIG. 7 illustrates an alternative example in which an ellipsis may be added at the first anchor point, as shown at 706. Thus, in contrast to FIG. 6, the ellipsis may be added without an image associated with the highest priority layer at the first anchor point (see e.g., the anchor point shown at 606 in FIG. 6, in which the ellipsis is added adjacent to the cloud image).

FIG. 7 further illustrates that, in response to the user selectively adding the second layer 110 via the layer management experience interface 106, the globe image may replace the callout image at an anchor point, as shown at 708. To illustrate, the second layer 110 may represent the highest priority layer. FIG. 7 illustrates a particular embodiment in which a conflict between layers may be resolved in favor of the highest priority layer and the image associated with highest priority layer may be the image identified at the particular location (rather than stacking images side by side in order of priority).

Thus, FIG. 7 illustrates another example in which the ordering of the icons displayed in the "Reading With" area 118 may be determined based on an order of selection by the user and may not reflect the priority of the particular selected layers. However, FIG. 7 also illustrates another example in which a single image may be displayed at a particular anchor point in the event of one or more layer conflicts. For example, the ellipsis image shown at 706 may represent the only image at that particular anchor point even though all five selected layers include supplementary content associated with the particular anchor point. As another example, the globe image shown at 708 may represent the only image at that particular anchor point even though another selected layer (e.g., the third layer 112) includes supplementary content associated with that particular anchor point.

Figure 8:
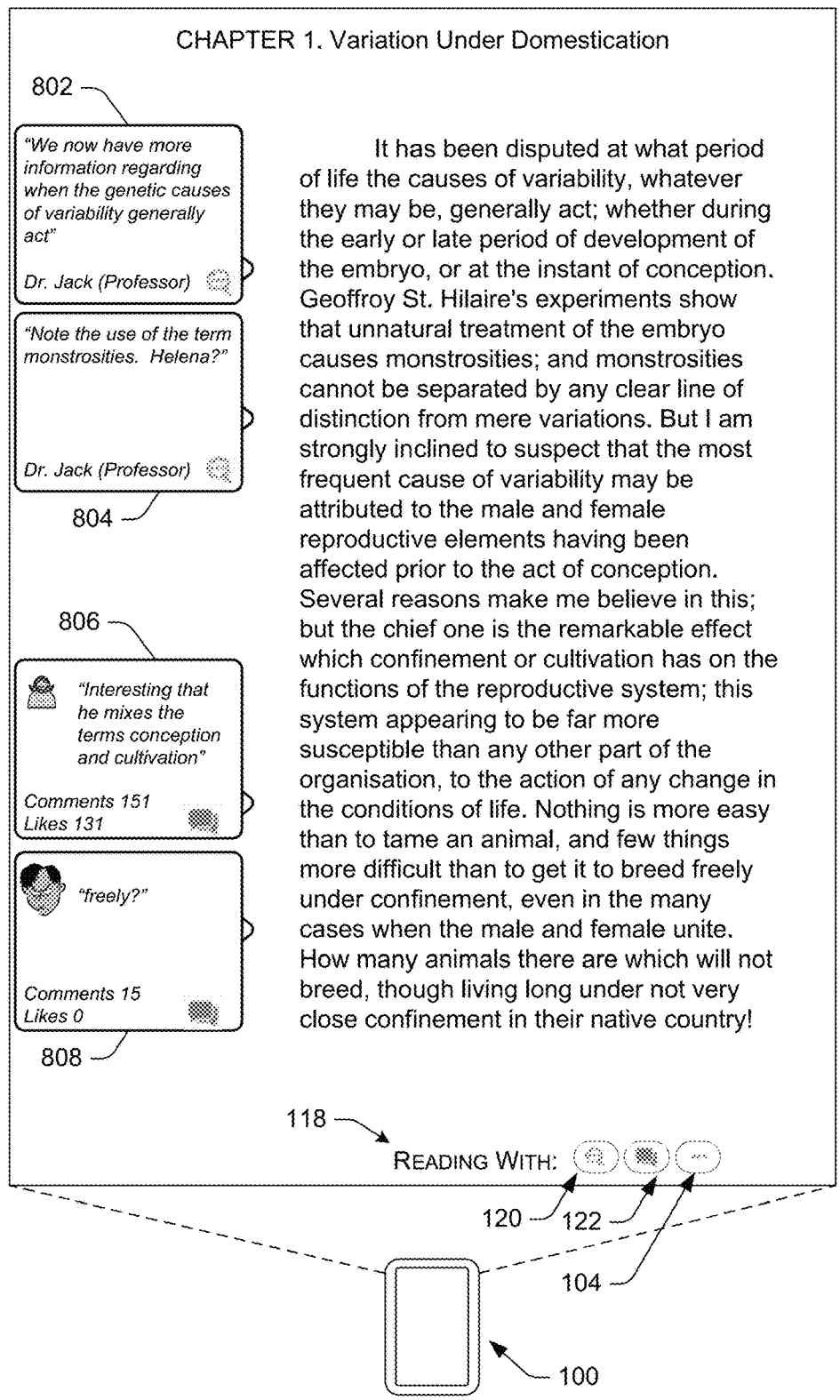
FIG. 8 illustrates another example of a user interface for displaying multiple layers of supplementary content associated with a digital work, according to some implementations.
Figure 9:
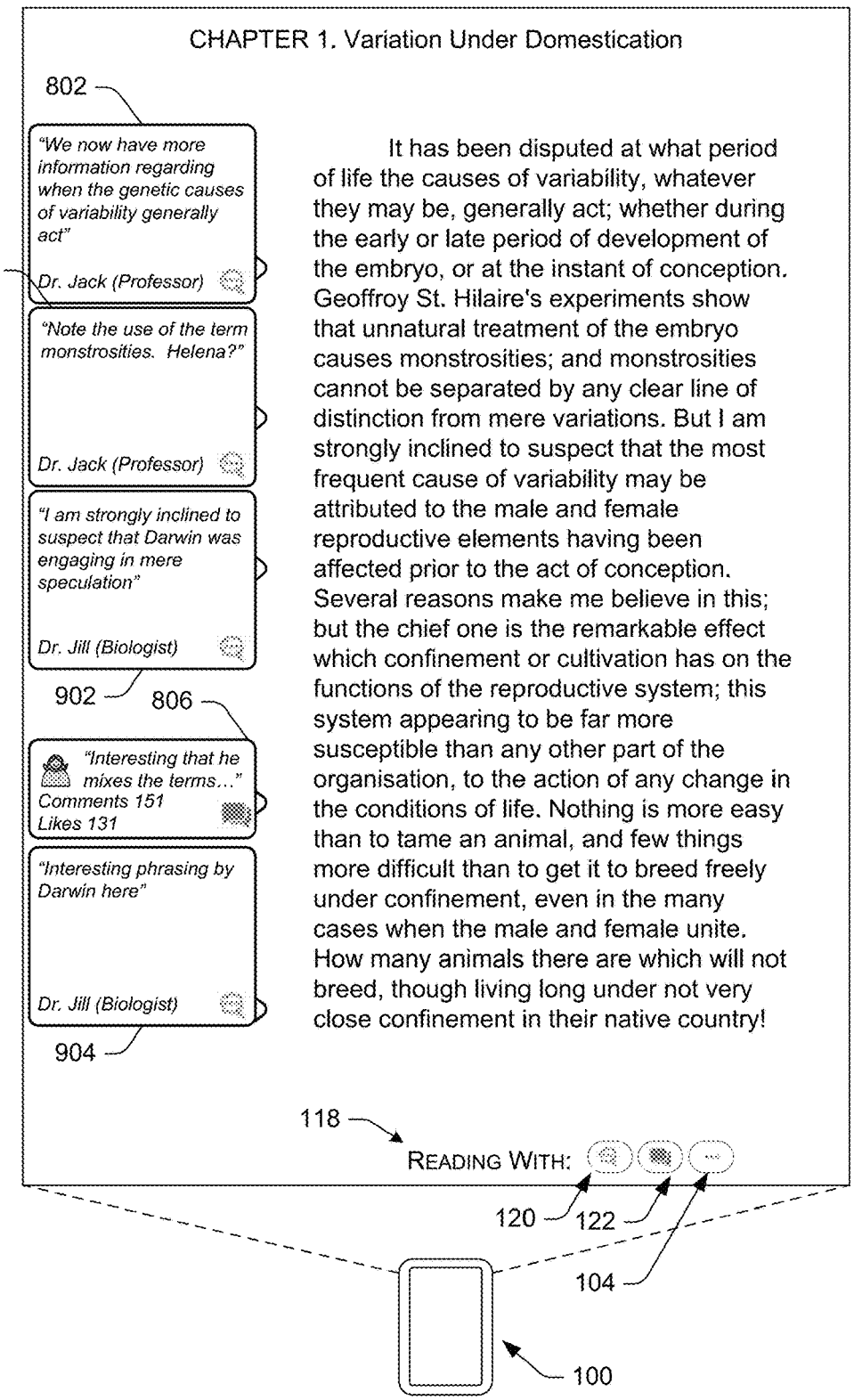
FIG. 9 illustrates another example of a user interface for displaying multiple layers of supplementary content associated with a digital work, according to some implementations.

FIGS. 8-10 illustrate a particular illustrative example of "resolving" conflicts by consolidating the amount of information that is used to convey comments. That is, "conflicts minimization" may represent part of the "conflict resolution" process.

FIG. 8 illustrates a particular embodiment in which the user has previously selected the selectable layer control 104 in order to select the first layer 108 (e.g., the "Commentary" layer) and the third layer 112 (e.g., the "Social" layer) via the layer management experience interface 106 (see e.g., FIG. 1). Accordingly, in the example of FIG. 8, the "Reading With" area 118 includes the first icon 120 (e.g., the cloud image) associated with the first layer 108 and the second icon 122 (e.g., the callout image) associated with the third layer 112.

In the particular embodiment illustrated in FIG. 8, the supplementary content includes four supplementary content items that are presented along with content of the digital work 102. In the particular embodiment illustrated, a first supplementary content item 802 and a second supplementary content item 804 are associated with the first layer 108 (e.g., the "Commentary" layer), while a third supplementary content item 806 and a fourth supplementary content item 808 are associated with the third layer 112 (e.g., the "Social" layer).

In some cases, one side of the screen (e.g., the right side) may represent a "primary" grid while another side (e.g., the left side) of the screen may represent a "secondary" grid. In FIG. 8, the supplementary content items 802, 804, 806 and 808 are each displayed on the left side of the screen, while the content associated with the digital work 102 is displayed on the right side of the screen. That is, FIG. 8 illustrates a particular example in which each of the supplementary content items are displayed in the "secondary" grid, while the content associated with the digital work 102 is displayed in the "primary" grid.

While not illustrated in the example of FIG. 8, in alternative embodiments, one or more supplementary content items associated with one or more layers may be displayed on the left side of the screen, while one or more supplementary content items associated with one or more other layers may be displayed on the right side of the screen. In some embodiments, a transition may occur that includes dividing the screen into the "primary" grid and the "secondary" grid. For example, in some cases, the transition may occur when a collective height of the supplementary content items exceeds a threshold (e.g., 50 percent of the height associated with the display of the electronic device 100).

FIG. 8 illustrates that when there is adequate display space available in the "secondary" grid, the size (e.g., a height, a width, or a combination thereof) of each of the supplementary content items 802, 804, 806 and 808 may be the same. That is, while the first and second supplementary content items 802 and 804 may be associated with a higher priority layer than the third and fourth supplementary content items 806 and 808, a size (e.g., at least one dimension, such as a height) of the each of the supplementary content items 802, 804, 806 and 808 may be the same.

FIG. 9 illustrates that the addition of additional supplementary content items may result in a change in size and/or removal of one or more supplementary content items associated with lower priority layers. To illustrate, in FIG. 9, two additional supplementary content items 902 and 904 that are associated with the first layer 108 may be added (see e.g., FIG. 17, where the user may add one or more additional commenters). Accordingly, FIG. 9 illustrates that a size (e.g., at least one dimension, such as the height in this example) of the third supplementary content item 806 may be reduced. Further, FIG. 9 illustrates that the fourth supplementary content item 808 has been removed. Referring to FIG. 8, a number of "likes" associated with the fourth supplementary content item 808 is zero. As such, FIG. 8 illustrates that one or more thresholds (e.g., "like" thresholds or "comments" thresholds) may be used to selectively filter supplementary content items in the event of a layer conflict.

FIG. 10 illustrates that, in some embodiments, a transition may occur from the divided screen that includes collapsing the "primary" grid and the "secondary" grid illustrated in FIGS. 8 and 9 into a single interface with glyphs being used to identity conflicts at various anchor points in the digital work 102.

Figure 11:
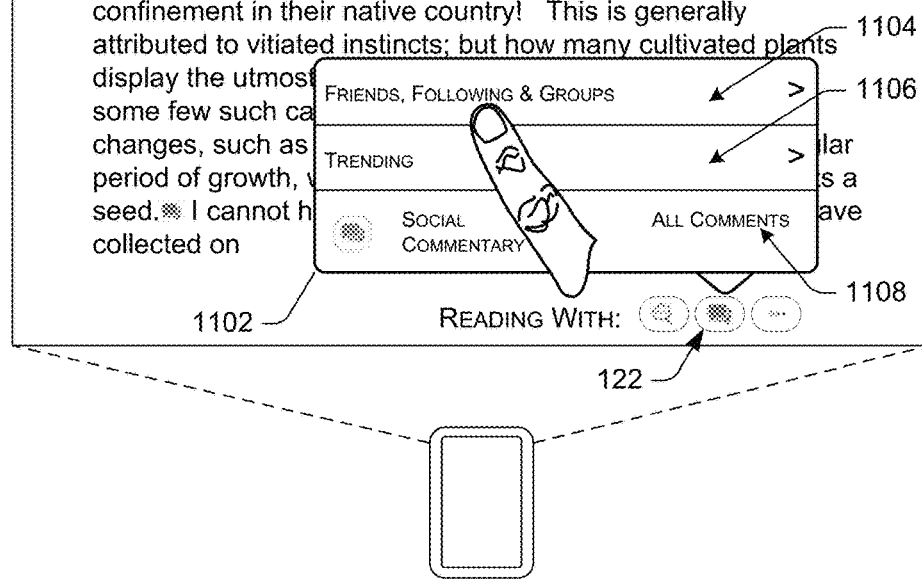
FIG. 11 illustrates an example of a user interface that may provide options for customizing the display of supplementary content at a layer level (e.g., at a "Social" layer level), according to some implementations.

FIG. 11 illustrates a first example in which the user is provided with options to customize the display of supplementary content at a layer level. That is, the user may select to display social annotations from friends, individuals that the user is following, groups, or commentary that is trending, among other alternatives. In this way, the user may individually customize the "Social" supplementary content to suit his or her interests.

To illustrate, in response to the user selecting the second icon 122 (e.g., the callout image), a layer level management experience interface 1102 associated with the particular layer (i.e., the "Social" layer in this case) may be displayed. The layer level management experience interface 1102 may include one or more sub-components associated with the particular layer. In general, the one or more sub-components may include "filter" settings (e.g., to filter a set of "Social" annotations/comments) and/or "ranking" settings (e.g., to sort a set of "Social" annotations/comments as trending based on recency). In some cases, the sub-components associated with a particular layer may be identified by an entity that created the particular layer.

In the example illustrated in FIG. 11, the layer level management experience interface 1102 associated with the "Social" layer includes a first sub-component 1104 and a second sub-component 1106. For example, the first sub-component 1104 may allow the user to selectively display social commentary from one or more friends, one or more individuals that the user is following and/or one or more groups. The second sub-component 1106 may allow the user to selectively display social commentary that is trending.

Figure 12:
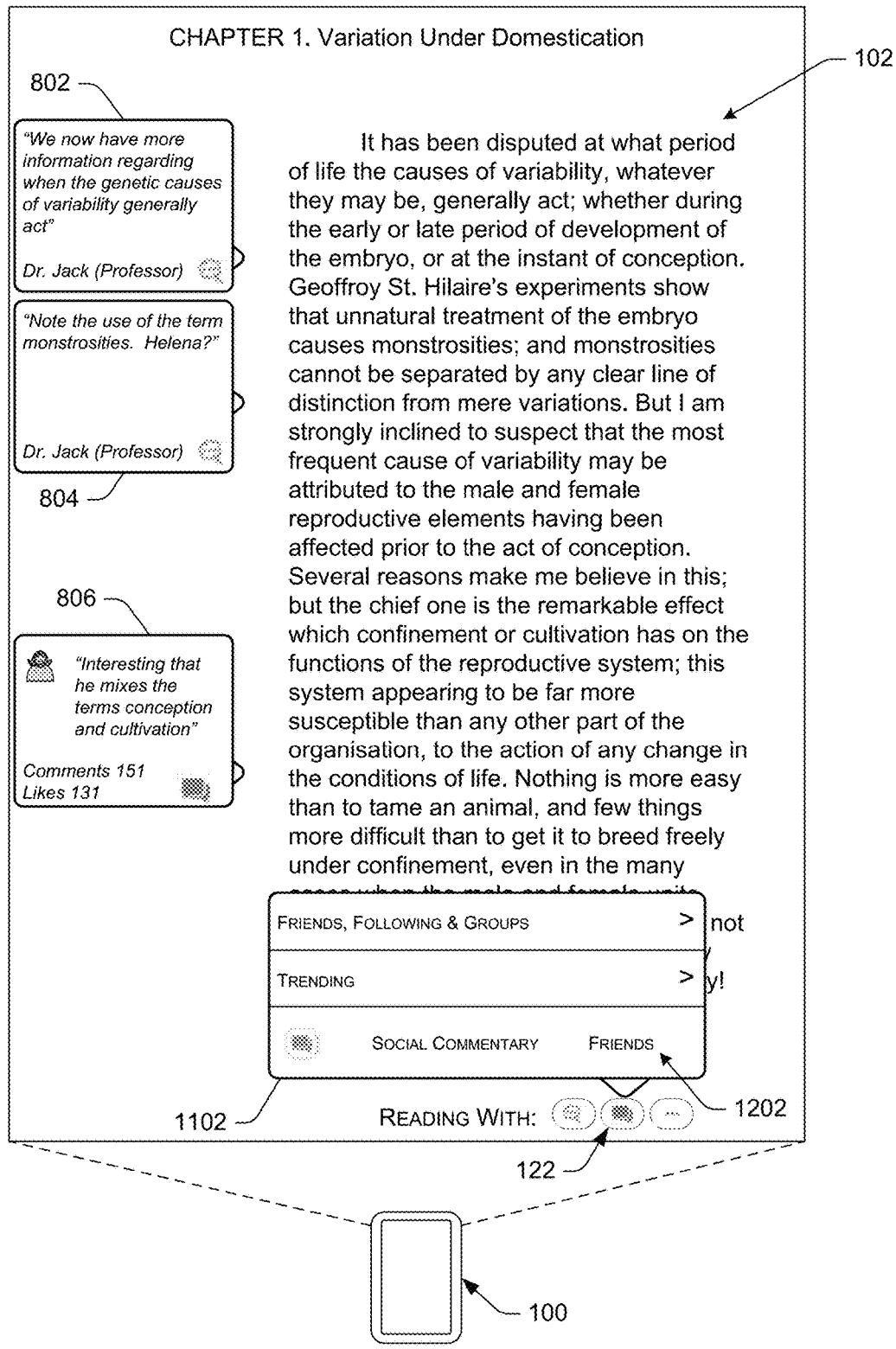
FIG. 12 illustrates an example of a user interface in which supplementary content items associated with different layers may be displayed in-line with the digital work, according to some implementations.

FIG. 11 illustrates that, prior to selection of either the first sub-component 1104 or the second sub-component 1106, the dedicated control window 1102 may provide an indication 1108 that "All Comments" are currently being displayed. FIG. 12 illustrates a particular example in which the "Social" annotations/comments have been filtered in response to the user selecting to display social annotations/comments from friends (shown as "Friends" at 1202).

In the particular embodiment illustrated in FIG. 12, the supplementary content includes three supplementary content items that are presented along with content of the digital work 102. In the particular embodiment illustrated, the first supplementary content item 802 and the second supplementary content item 804 are associated with the first layer 108 (e.g., the "Commentary" layer), while the third supplementary content item 806 is associated with the third layer 112 (e.g., the "Social" layer).

In the example of FIG. 12, as the total number of supplementary content items has been reduced to three, the supplementary content items 802, 804 and 806 may each be displayed on the left side of the screen, while the content associated with the digital work 102 may be displayed on the right side of the screen. That is, FIG. 12 illustrates a particular example in which each of the supplementary content items are displayed in the "secondary" grid, while the content associated with the digital work 102 is displayed in the "primary" grid, rather than using glyphs at various anchor points within the text.

Figure 13:
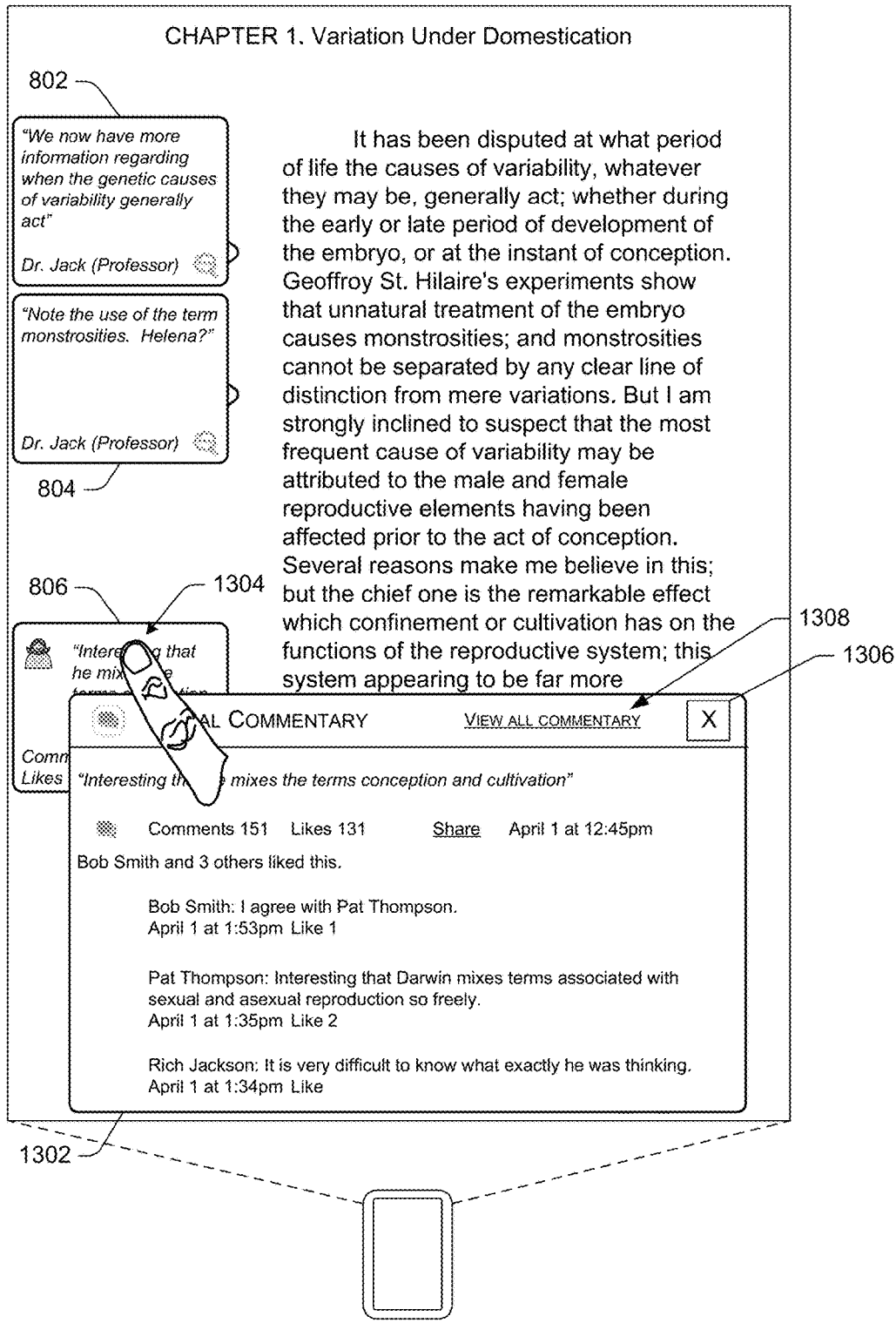
FIG. 13 illustrates an example of a user interface in which a user may select to interact with a particular layer by selecting a supplementary content item associated with the particular layer, according to some implementations.

FIG. 13 illustrates an example in which the user may interact with a particular layer by "tapping" or otherwise selecting a particular portion of the supplementary content that is displayed. To illustrate, a dedicated "Social Commentary" interface 1302 may be displayed in response to the user selecting a particular social commentary item (e.g., the third supplementary content item 806, as shown at 1304). In the example of FIG. 13, exemplary social commentary features include the ability to comment, like and/or share, among other alternatives. Further, a selectable exit icon 1306 may allow the user to close the dedicated "Social Commentary" interface 1302 and return to the main display area.

In the embodiment illustrated in FIG. 13, a selectable "View All Commentary" icon 1308 may allow the user to display a full screen "Social Commentary" user interface (not shown). In some cases, the full screen "Social Commentary" user interface may include an index of the particular layer's contents across the digital work 102, which may provide the user with more complete information and may assist the user in navigating via the particular layer. For example, in the case of the "Social Commentary" layer, the user may select to display all social comments throughout the digital work 102. To illustrate, when the digital work 102 includes an electronic book, the user may be provided with the ability to sort comments by page, search for particular comments from particular users, and directly navigate to the location in the book. As an example, this functionality may be particularly useful if the user is using a layer to re-read an electronic book. In a subsequent reading of the electronic book, the user may desire to "re-read" the electronic book through the eyes of the particular feature (in this case, the "Social Commentary" feature) without having to proceed in a typical page-by-page manner.

Figure 14:
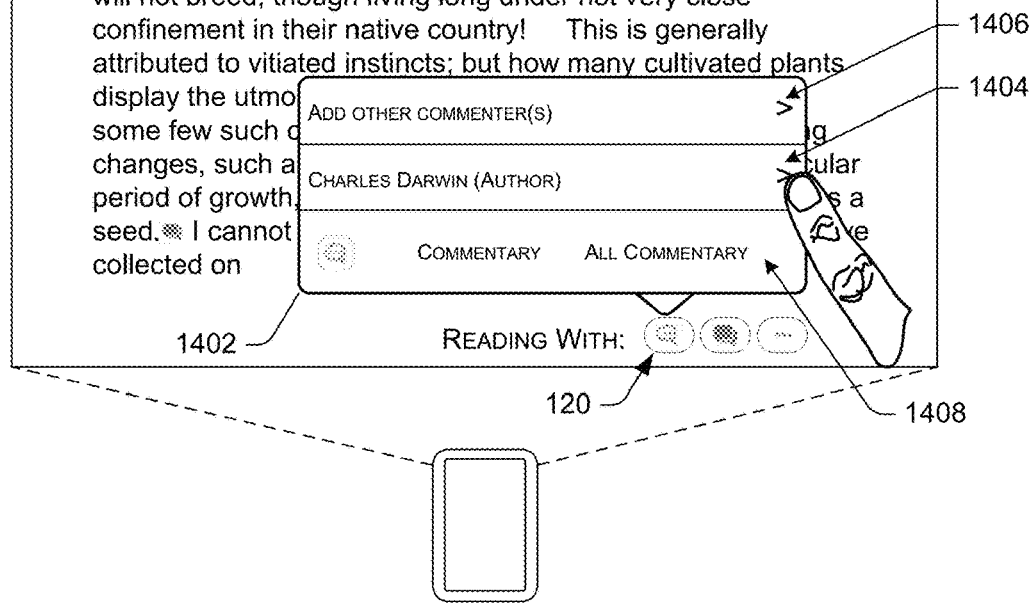
FIG. 14 illustrates another example of a user interface that may provide options for customizing the display of supplementary content at a layer level (e.g., at a "Commentary" level), according to some implementations.

FIG. 14 illustrates another example in which the user is provided with options to customize the display of supplementary content at a layer level. That is, in the example of FIG. 14, the user may select to display commentary from an author or other commenter(s). In this way, the user may individually customize the "Commentary" layer to suit his or her interests.

To illustrate, in response to the user selecting the first icon 120 (e.g., the cloud image), a layer level management experience interface 1402 associated with the particular layer (i.e., the "Commentary" layer in this case) may be displayed. The layer level management experience interface 1402 may include one or more sub-components associated with the particular layer.

In the example illustrated in FIG. 14, the layer level management experience interface 1402 associated with the "Commentary" layer includes a first sub-component 1404 and a second sub-component 1406. For example, the first sub-component 1404 may allow the user to selectively display commentary from an author, while the second sub-component 1406 may allow the user to selectively display commentary from one or more other commenters.

FIG. 14 illustrates that, prior to selection of either the first sub-component 1404 or the second sub-component 1406, the layer level management experience interface 1402 may provide an indication 1408 that "All Commentary" is currently being displayed.

Figure 15:
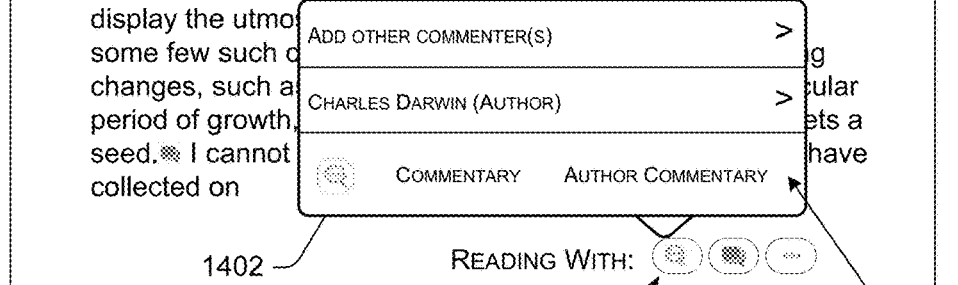
FIG. 15 illustrates an example of the user interface of FIG. 14 after the user has customized the display of supplementary content at the particular layer level (e.g., by selectively identifying "Author Commentary" at the "Commentary" level).

FIG. 15 illustrates a particular example in which the user has selected to filter the commentary by author (shown as "Author Commentary" at 1502). FIG. 15 further illustrates that by filtering the "Commentary" layer to include only commentary from the author of the digital work 102, cloud images associated with commentary from individual(s) other than the author may be removed. Further, as conflicts no longer exist between supplementary content items associated with the "Commentary" layer and the "Social" layer at various anchor point locations in the digital work 102 that are associated with commentary from commenter(s) other than the author, the callout image may be displayed instead of the cloud image.

Figure 16:
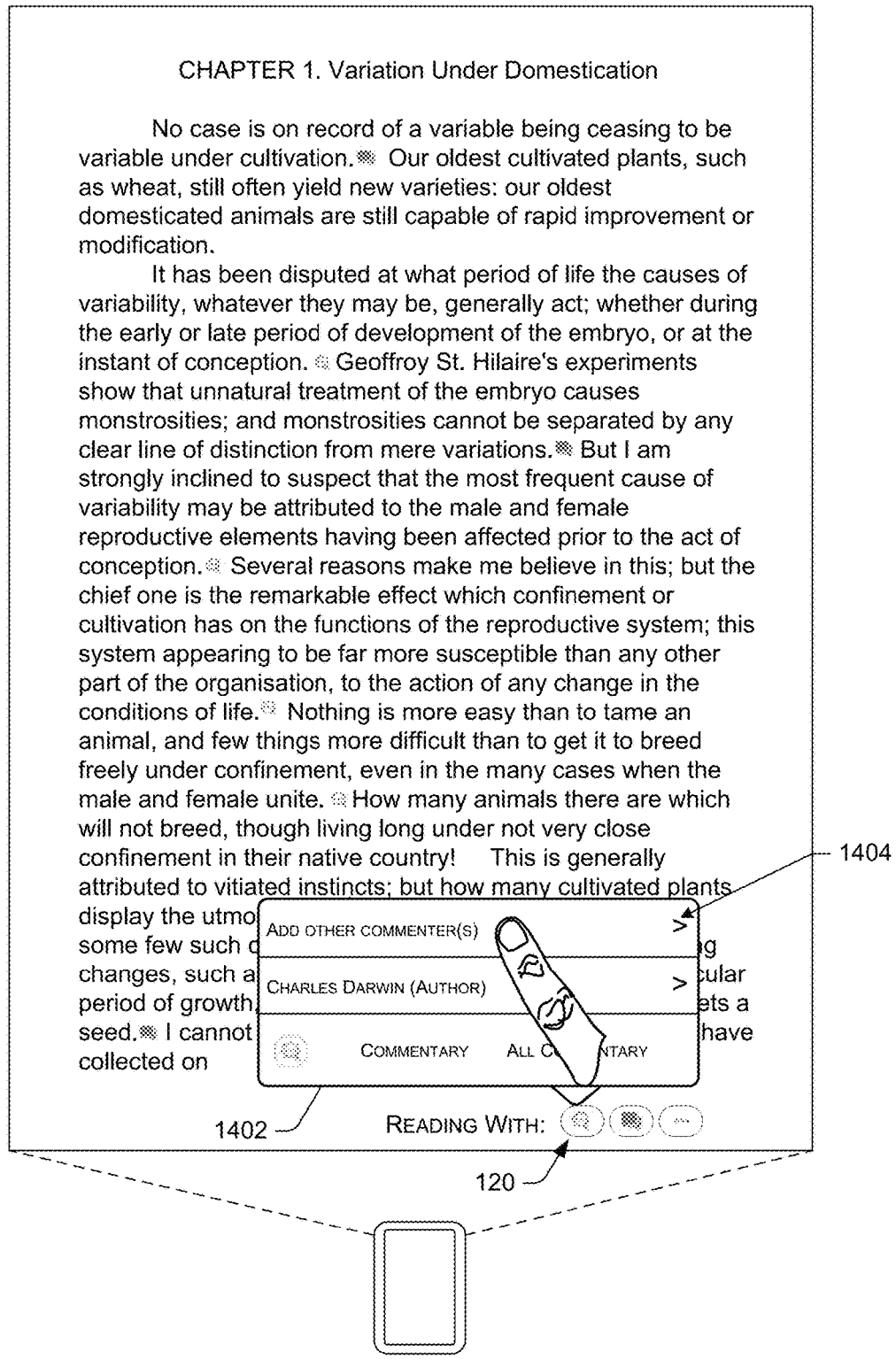
FIG. 16 illustrates that one example of an option for customizing the display of supplementary content at a particular layer level (e.g., at the "Commentary" level) may include the option to add commentary from other commenter(s) (e.g., other than the author of the digital work), according to some implementations.

FIG. 16 illustrates that the user may select the "Add Other Commenter(s)" sub-component 1404 via the layer level management experience interface 1402 associated with the "Commentary" layer. FIG. 17 illustrates a particular example in which the user is presented with a plurality of other commenters 1702 that are associated with the digital work 102. In the example of FIG. 17, the plurality of other commenters 1702 includes a first commenter 1704 (e.g., a professor named "Dr. Jack"), a second commenter 1706 (e.g., a biologist named "Dr. Jill"), and a third commenter 1708 (e.g., a creationist named "Dr. Who"). FIG. 17 illustrates that commentary from some commenters may be free, while commentary from other commenters may be purchased. To illustrate, commentary from the first commenter 1704 and the third commenter 1708 is identified as being free, while a price (e.g., $1.99) is identified for commentary from the second commenter 1706.

Figure 18:
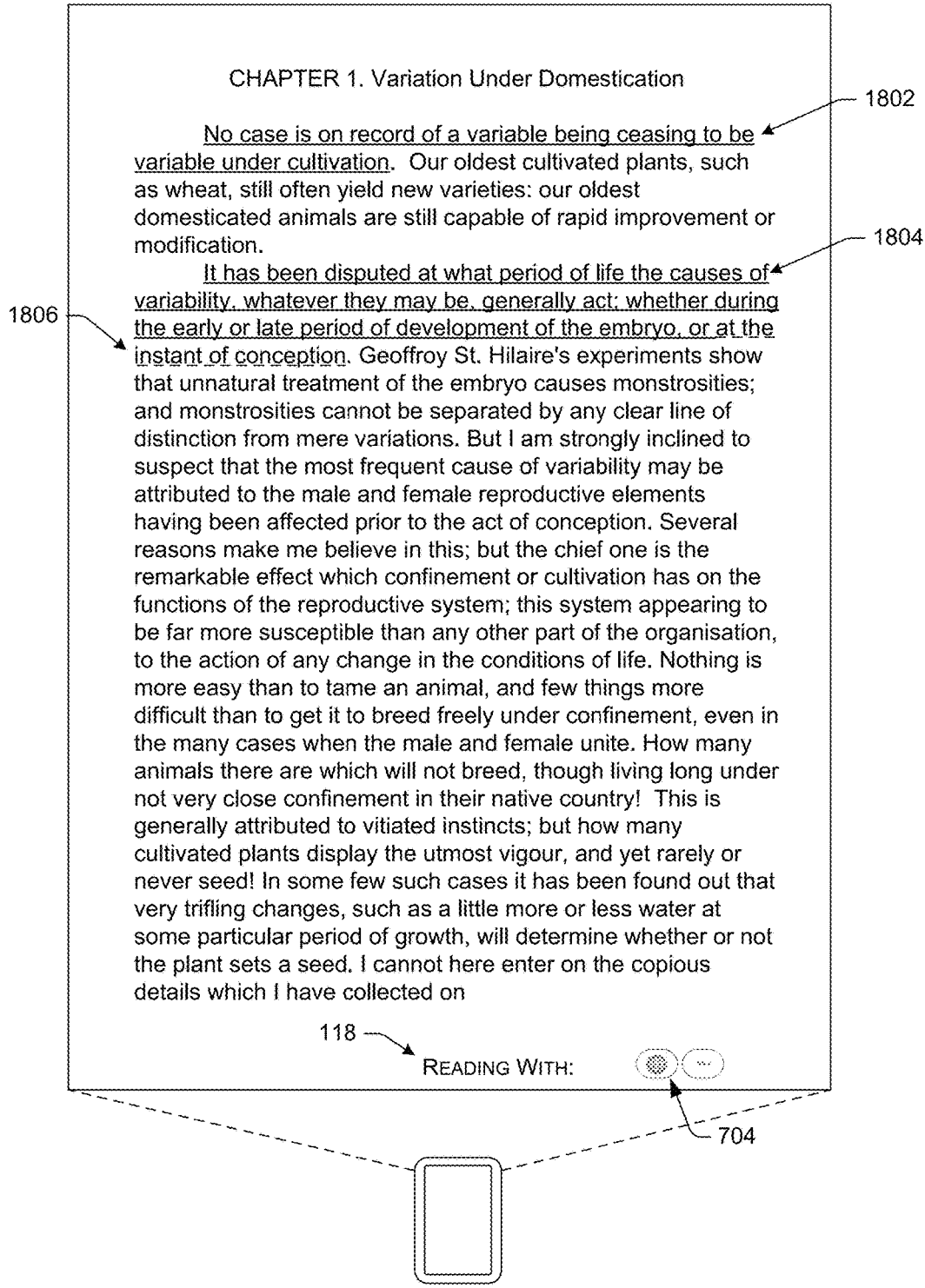
FIG. 18 illustrates an example of a user interface that identifies an intra-layer conflict (e.g., a highlighting or underlining conflict).

FIG. 18 illustrates an example of resolving conflicts that include highlights. To illustrate, in FIG. 18, the "Reading With" area 118 includes the icon 704 that is associated with the second layer 110 (e.g., the "Highlights" layer).

In FIG. 18, a first highlight is identified by underlined text with an unbroken line, as shown at 1802, while a second highlight is identified by underlined text that includes a first portion of text that is underlined with an unbroken line, as shown at 1804, and a second portion of text that is underlined by a dashed line, as shown at 1806.

Figure 19:
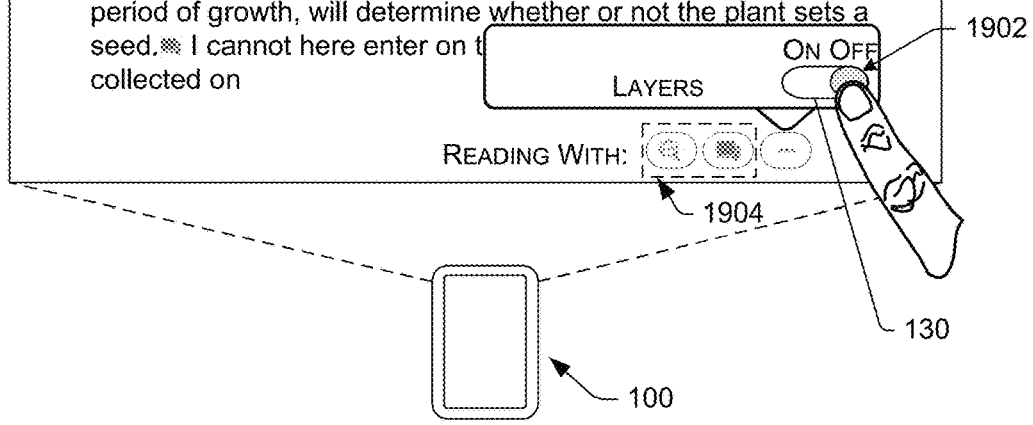
FIG. 19 illustrates an exemplary layer management experience interface that may include an icon (e.g., a "layers mute button") that may allow the user to temporarily deactivate the selected layer(s) such that the content of the digital work may be displayed without the supplementary content, according to some implementations.

FIG. 19 illustrates an example of the user selecting the selectable layer deactivation icon 130 to temporarily deactivate the selected layer(s). For example, the user may move the virtual switch from an "on" position to an "off" position, as shown at 1902.

FIG. 19 illustrates that the currently selected layer(s) may remain selected in the layer management experience interface 106, but one or more visual representations associated with the selected layer(s) (e.g., the first layer 108 and the third layer 112 in this particular example) may be removed such that the digital work 102 may be displayed without overlying content. FIG. 19 illustrates that the selectable layer deactivation icon 130 may represent a "layers mute button" that allows the user to deactivate the visible state of layers within the digital work 102 temporarily without changing the user's current selections (as indicated by the dashed lines surrounding the selected layers at 1904). For example, the user may have two layers (e.g., the "Social" layer and the "Commentary" layer) that the user may prefer to see at some times, but there may be other times when the user does not prefer to see the layers but would prefer to see the raw digital work 102. FIG. 19 illustrates that the selectable layer deactivation icon 130 may allow the user to easily turn the preferred layers back on, without having to navigate through the layer management experience interface 106 again (e.g., to select the first layer 108 and the third layer 112).

Figure 20:
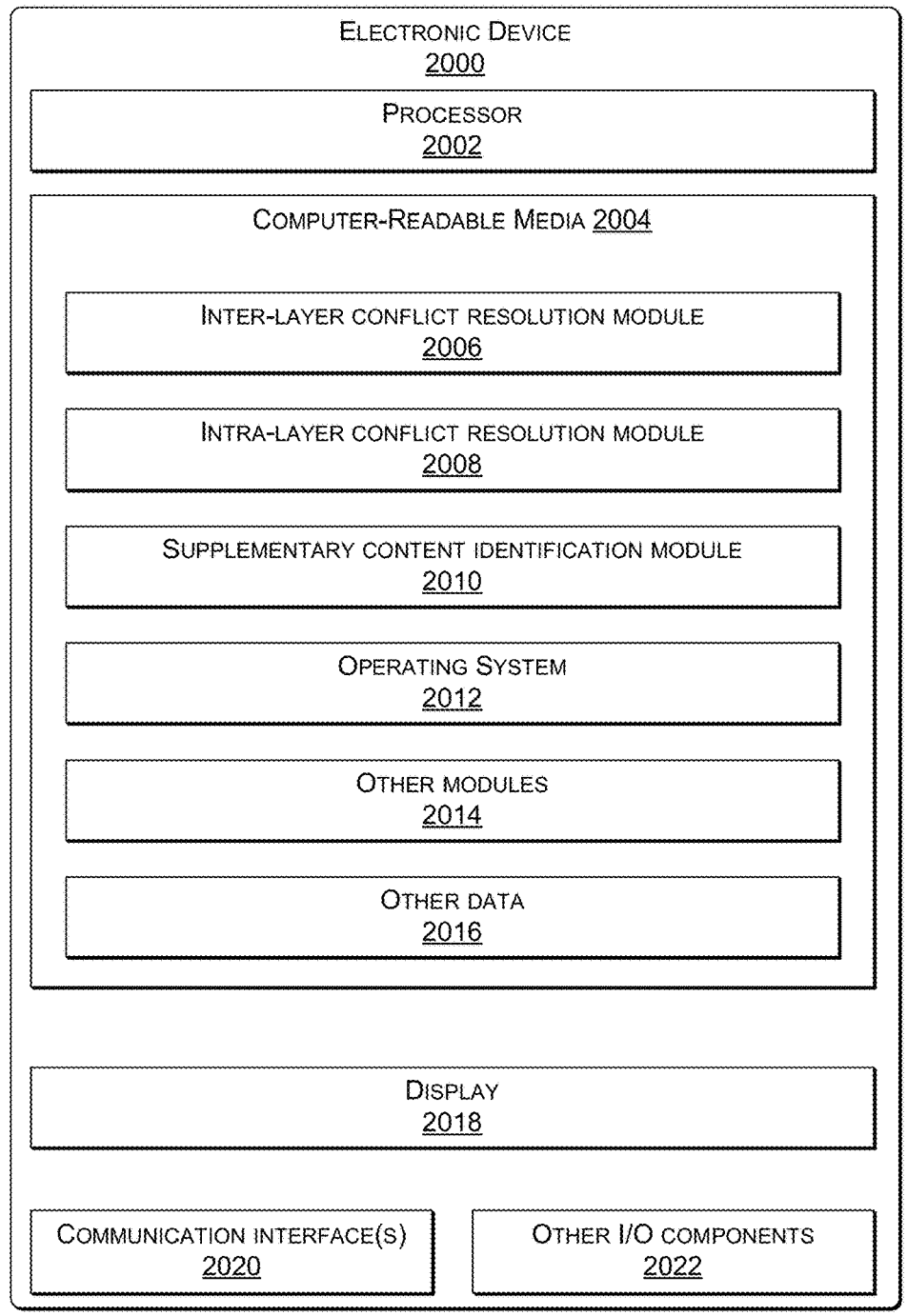
FIG. 20 illustrates select components of an example electronic device configured to display content associated with a digital work (e.g., an electronic book) as well as supplementary content associated with various overlay layers that may be associated with a particular digital work, according to some implementations.

FIG. 20 illustrates select example components of an electronic device 2000 that may be used to implement the functionality described above according to some implementations. The electronic device 2000 illustrated in FIG. 20 may correspond to the electronic device 100 of FIGS. 1-19. In a very basic configuration, the electronic device 2000 includes, or accesses, components such as at least one processor 2002 and a computer-readable media 2004. Each processor 2002 may itself comprise one or more processors or cores. The processor(s) 2002 can be configured to fetch and execute computer-readable instructions stored in the computer-readable media 2004 or other computer-readable media.

The electronic device 2000 may be implemented as any of a number of electronic devices, such as a smart phone, an eBook reader, a media player, a tablet computing device, a portable gaming device, a portable digital assistant, a laptop or netbook computer, and so forth. Furthermore, the electronic device 2000 may not necessarily be a mobile or portable device, and thus, in some implementations may include a display of a desktop or other computing device, a gaming system, a television, other home electronics devices, and so forth.

Depending on the configuration of the electronic device 2000, the computer-readable media 2004 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 2002 directly or through another computing device. Accordingly, the computer-readable media 2004 may be computer-readable media able to maintain instructions, modules or components executable by the processor 2002.

The computer-readable media 2004 may be used to store any number of functional components that are executable by the processor 2002. In some implementations, these functional components comprise instructions or programs that are executable by the processor 2002 and that, when executed, implement operational logic for performing the actions attributed above to the electronic device 2000. Functional components of the electronic device 2000 stored in the computer-readable media 2004 may include an inter-layer conflict resolution module 2006, an intra-layer conflict resolution module 2008, and a supplementary content identification module 2010, which may be executed on the processor 2002. For example, the inter-layer conflict resolution module 2006 may be executed on the processor 2002 to resolve one or more conflicts between supplementary content layers. As another example, the intra-layer conflict resolution module 2008 may be executed on the processor 2002 to resolve conflicts within a particular supplementary content layer. As a further example, the supplementary content identification module 2010 may be executed on the processor 2002 to identify supplemental content for display in conjunction with a particular digital work. Other functional components may include an operating system 2012 for controlling and managing various functions of the electronic device 2000. Depending on the type of the electronic device 2000, the computer-readable media 2004 may also optionally include other functional components, such as other modules 2014, which may include applications, programs, drivers and so forth.

The computer-readable media 2004 may also store data, data structures, and the like that are used by the functional components. The electronic device 2000 may also include other data 2016, which may include, for example, data used by the operating system 2012 and the other modules 2014. Further, the electronic device 2000 may include many other logical, programmatic and physical components, of which those described are merely examples that are related to the discussion herein.

FIG. 20 further illustrates that the electronic device 2000 may include a display 2018, which may be passive, emissive or any other form of display. In one implementation, the display 2018 may be an active display such as a liquid crystal display, plasma display, light emitting diode display, organic light emitting diode display, and so forth. For convenience only, the display 2018 of the electronic device 100 of FIGS. 1-19 is shown in a generally rectangular configuration. However, it is understood that the display 2018 may be implemented in any shape, and may have any ratio of height to width. Also, for stylistic or design purposes, the display 2018 may be curved or otherwise non-linearly shaped. Furthermore, the display 2018 may be flexible and configured to fold or roll.

One or more communication interfaces 2020 may support both wired and wireless connection to various networks, such as cellular networks, radio, WiFi networks, short-range or near-field networks (e.g., Bluetooth®), infrared signals, local area networks, wide area networks, the Internet, and so forth. The communication interface 2020 may further allow a user to access storage on another device, such as a user's computing device, a network attached storage device, or the like.

The electronic device 2000 may further be equipped with various other input/output (I/O) components 2022. Such I/O components may include a touchscreen and various user actuatable controls (e.g., buttons, a joystick, a keyboard, a mouse, etc.), speakers, a microphone, a camera, connection ports, and so forth. For example, the operating system 2012 of the electronic device 2000 may include suitable drivers configured to accept input from a keypad, keyboard, or other user actuatable controls and devices included as the I/O components 2022. For instance, the user actuatable controls may include page turning buttons, navigational keys, a power on/off button, selection keys, and so on. Additionally, the electronic device 2000 may include various other components that are not shown, examples of which include removable storage, a power source, such as a battery and power control unit, a global positioning system (GPS) device, a PC Card component, an accelerometer, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 21:
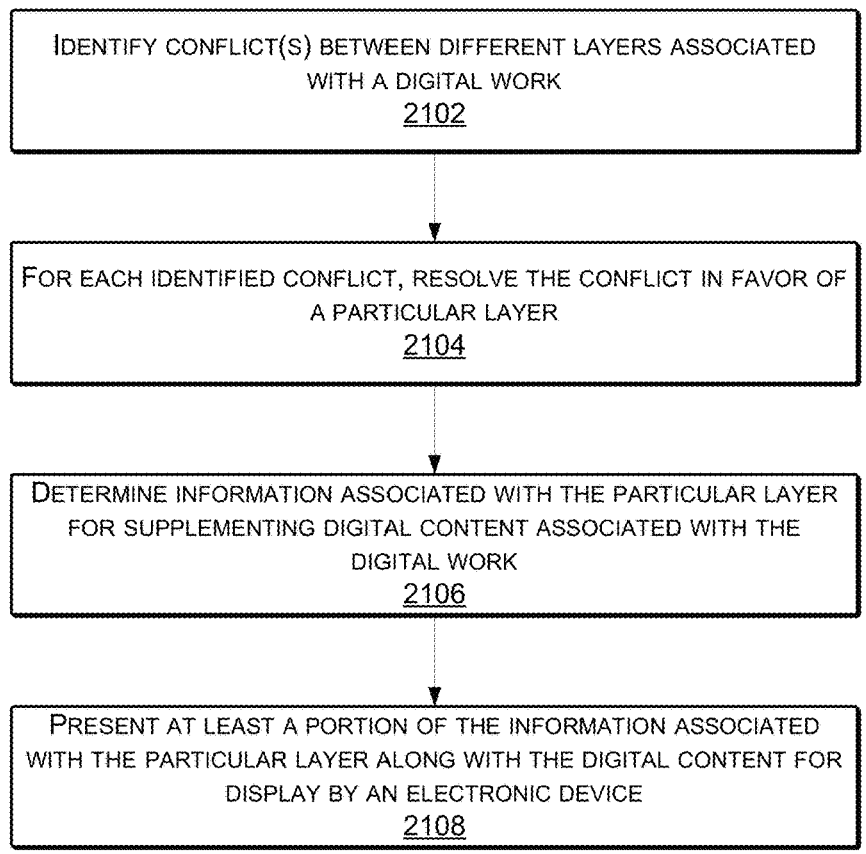
FIG. 21 illustrates an example process for identifying and resolving conflict(s) between different layers (e.g., an "inter-layer" conflict) associated with a particular digital work, according to some implementations.

FIG. 21 illustrates an example process 2100 for resolving conflicts between different layers (e.g., "inter-layer" conflicts), as described above. FIG. 21 illustrates the process 2100 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

Referring to FIG. 21, the process 2100 includes identifying one or more conflicts between different layers associated with a digital work, at 2102. For example, referring to FIGS. 1 and 2, conflicts between the first layer 108 and the third layer 112 may be identified for various anchor point locations within the digital work 102.

At 2104, the process 2100 may include, for each identified conflict, resolving the conflict in favor of a particular layer. To illustrate, in FIG. 1, the conflict between the first layer 108 and the third layer 112 is resolved in favor of the first layer 108, as shown by the cloud images at the various anchor location identifiers 132, 134, 136 and 138.

In some embodiments, resolving conflicts may include determining how frequently data for a particular layer appears in the digital work 102. As an illustrative example, "popular" highlights associated with the second layer 110 may appear a limited number of times in a particular book (e.g., ten times). Accordingly, each "popular" highlight may be more "valuable" to a reader than individual social comments, of which there may be many.

In some embodiments, resolving conflicts may include determining whether data from a particular layer is repetitive within the digital work 102. For example, a "hard" word in a "Reading Support" layer may appear more than one time in a book, so removing the word in one location may not result in removal throughout the book.

In some embodiments, resolving conflicts may include determining a priority by source. To illustrate, personal content may rank above third-party content, and some types of third-party content (e.g., author notes) may rank above other types of third-party content (e.g., non-author notes).

In some embodiments, "upvotes" may be used for layers with crowdsourced data. As an illustrative, non-limiting example, assuming one "like" for a social annotation equals one "upvote" for an authored note, then a social annotation with two "likes" may rank higher than an authored note with one "upvote."

In some embodiments, a priority may determined based on one or more customer characteristics or previous behavior(s). To illustrate, this may be a fixed priority, or a machine learning model may learn a customer's preferences over time. In some embodiments, priority may be based on a customer setting.

At 2106, the process 2100 may include determining information associated with the particular layer for supplementing digital content associated with the digital work.

At 2108, the process 2100 may include presenting at least a portion of the information associated with the particular layer along with the digital content for display by an electronic device.

Figure 22:
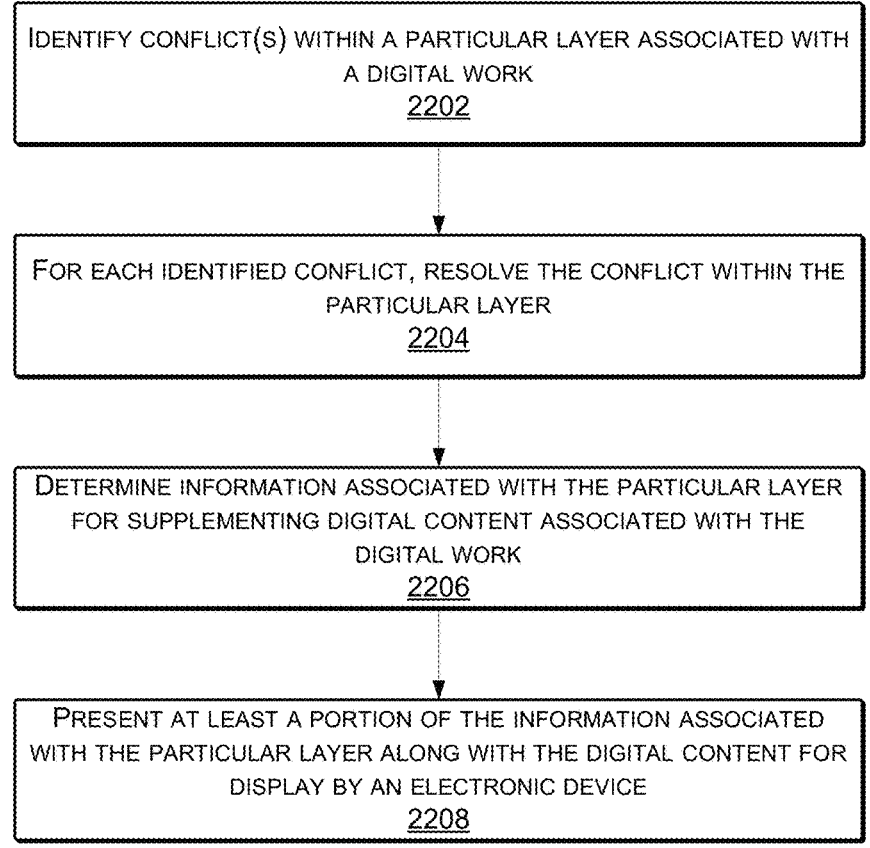
FIG. 22 illustrates an example process for resolving conflict(s) within a particular layer (e.g., an "intra-layer conflict") associated with a particular digital work, according to some implementations.

FIG. 22 illustrates an example process 2200 for resolving conflicts within a particular layer (e.g., an "intra-layer" conflict), as described above. FIG. 22 illustrates the process 2200 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

Referring to FIG. 22, the process 2200 includes identifying one or more conflicts within a particular layer associated with a digital work, at 2202. For example, referring to FIG. 18, intra-layer highlighting and/or underlining conflict(s) may be identified at one or more locations within the digital work 102.

At 2204, the process 2200 may include, for each identified conflict, resolving the conflict within the particular layer. For example, FIG. 18 illustrates an intra-layer highlighting/underlining conflict within the sentence "It has been disputed at what period of life the causes of variability, whatever they may be, generally act; whether during the early or late period of development of the embryo, or at the instant of conception." As shown in FIG. 18, a first portion of the text is underlined with an unbroken line, as shown at 1804, while a second portion of text (i.e., "at the instant of conception") is underlined by a dashed line, as shown at 1806. That is, the conflict within the second layer 110 (e.g., the "Highlights" layer) is associated with the portion of the second portion of text (i.e., "at the instant of conception").

At 2206, the process 2200 may include determining information associated with the particular layer for supplementing digital content associated with the digital work. At 2208, the process 2200 may include presenting at least a portion of the information associated with the particular layer along with the digital content for display by an electronic device. To illustrate, referring to FIG. 18, supplementing the content associated with the digital work 102 may include underlining the first portion of the text with an unbroken line, as shown at 1804. Further, referring to FIG. 18, supplementing the content associated with the digital work 102 may include underlining the second portion of the text (i.e., "at the instant of conception") with a dashed line, as shown at 1806.

Figure 23:
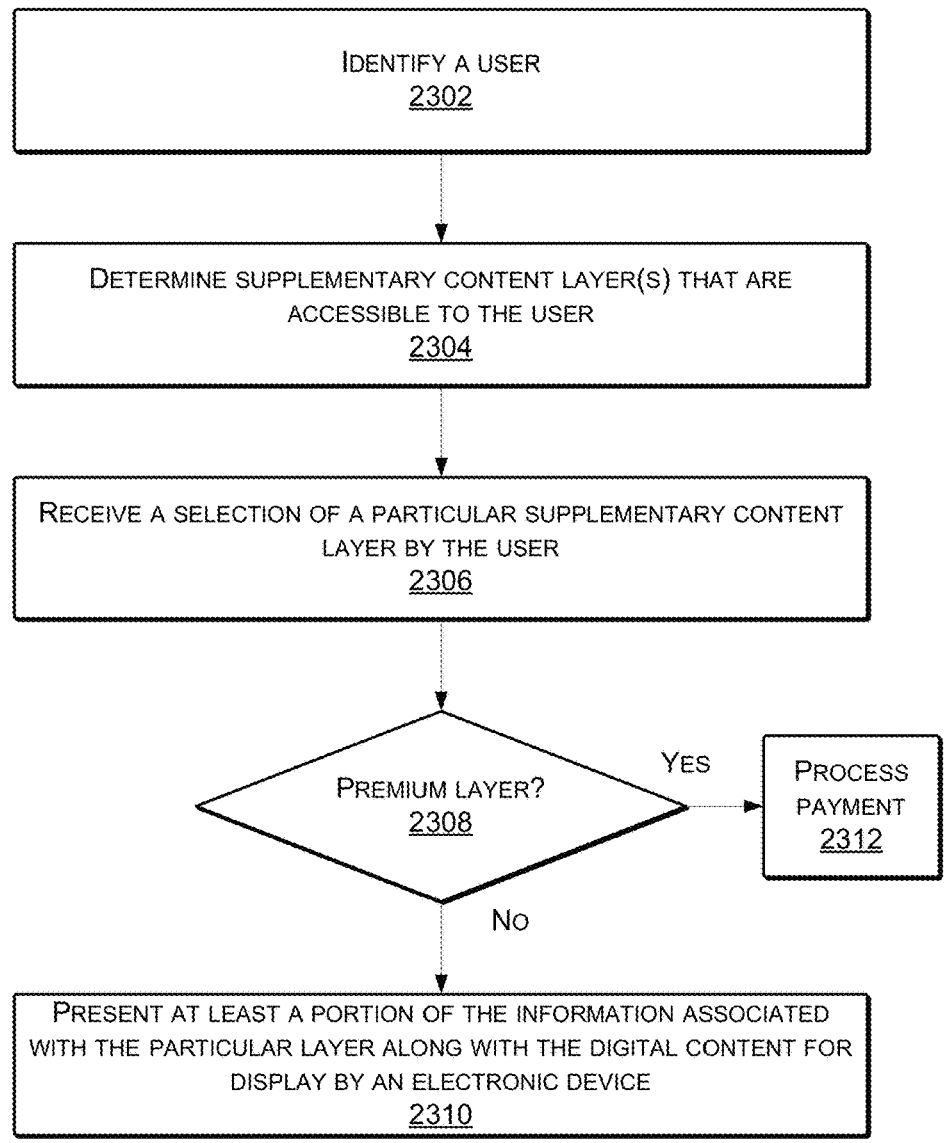
FIG. 23 illustrates an example process for determining one or more layers that are available to a particular user and whether a particular selected layer represents a premium layer, according to some implementations.

FIG. 23 illustrates an example process 2300 for determining whether a particular selected layer is available to a user for free or whether the particular selected layer represents a premium layer, as described above. FIG. 23 illustrates the process 2300 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

The process 2300 includes identifying a user at 2302. For example, referring to FIG. 3, the one or more computing devices 304 may identify the user 302 based at least in part on the first internal source 322 (e.g., the account database). The process 2300 includes determining one or more supplementary content layers that are accessible to the user, at 2304. For example, referring to FIG. 3, the layer content identification module 308 may determine one or more supplementary content layers that are accessible to the user based at least in part on information stored in the layer content database 316.

The process 2300 includes receiving a selection of a particular supplementary content layer by the user, at 2306. To illustrate, referring to FIG. 17, the user may select to add one or more additional commenters via the layer level management experience interface 1402 associated with the first layer 108 (i.e., the "Commentary" layer in FIG. 17).

The process 2300 includes determining whether the selected layer is a "premium" layer (for the particular identified user), at 2308. In the event that the layer does not represent a premium layer for the particular user, the process 2300 includes presenting at least a portion of the information associated with the particular layer along with the digital content for display by an electronic device, at 2310. In the event that the layer is a premium layer, the process 2300 includes processing payment, at 2312.

As an illustrative example, referring to FIG. 17, the user may be a student and may select commentary from her professor "Dr. Jack" (i.e., the first commenter 1704). In this case, commentary may be free. As another example, the user may select commentary from a creationist named "Dr. Who" (i.e., the third commenter 1708). In this case, commentary may also be free. As an alternative example, the user may select commentary from a biologist named "Dr. Jill" (i.e., the second commenter 1706). In this case, the commentary may represent premium content, and the user may be charged (e.g., $1.99 in the example of FIG. 17). To illustrate, the one or more computing devices 304 may access the second internal source 324 to process payment from the user 302 for the premium content.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
under control of one or more processors,
determining, for a first location within a digital work, a first conflict between a first layer of supplementary content and a second layer of supplementary content by determining that both the first layer and the second layer are associated with the first location;
resolving the first conflict by determining that the first layer represents a higher priority layer than the second layer;
determining a first visual identifier that is associated with the first layer;
determining a second visual identifier that is associated with the second layer;
generating first data for display of a portion of the digital work that includes the first location associated with the first conflict; and
based at least partly on determining that the first layer represents the higher priority layer, generating second data for display of the first visual identifier at the first location,
the second data causing the first visual identifier to be displayed at the first location, without the second visual identifier, when the first and second layers are active.

2. The method as recited in claim 1, wherein generating second data for display of the first visual identifier comprises generating data that causes the first visual identifier to appear different from the second visual identifier that is associated with the second layer.

3. The method as recited in claim 2, wherein:
generating second data for display of the first visual identifier at the first location comprises generating data for display of the first visual identifier on a particular page of an electronic book;
the first location includes a first anchor point associated with the particular page of the electronic book; and
the first visual identifier is displayed to be visually associated with the first anchor point within the electronic book.

4. The method as recited in claim 2, wherein:
generating second data for display of the first visual identifier at the first location comprises generating data for display of the first visual identifier on a particular page of an electronic book;
the first location includes at least a portion of one or more sentences associated with the particular page of the electronic book; and
the first visual identifier includes a first style of at least one of highlighting or underlining of the portion of the one or more sentences associated with the particular page of the electronic book.

5. The method as recited in claim 4, wherein the second visual identifier includes a second style of highlighting or underlining of the portion of the one or more sentences within the electronic book.

6. The method as recited in claim 1, further comprising:
identifying, at a second location within the digital work, a second conflict between the first layer of supplementary content and a third layer of supplementary content by determining that both the first layer and the third layer are associated with the second location; and
determining whether the first layer represents a higher priority layer than the third layer.

7. The method as recited in claim 6, further comprising:
resolving the second conflict by determining that the first layer represents a higher priority layer than the third layer; and
causing display of the first visual identifier at the second location within the digital work.

8. The method as recited in claim 6, further comprising:
resolving the second conflict by determining that the third layer represents a higher priority layer than the first layer; and
causing display of a third visual identifier associated with the third layer at the second location within the digital work.

9. The method as recited in claim 2, wherein maintaining activation of the first layer comprises:
displaying first supplementary content of the first layer with a first page of the plurality of pages; and
displaying second supplementary content of the first layer, different from the first supplementary content, with a second page of the plurality of pages.

10. The method as recited in claim 9, wherein:
the digital work is an electronic book;
the second location includes a second anchor point within the electronic book; and
the third visual identifier is displayed at the second anchor point within the electronic book.

11. The method as recited in claim 1, wherein resolving the first conflict by determining that the first layer represents the higher priority layer than the second layer includes evaluating layer priority information associated with a particular user.

12. The method as recited in claim 1, further comprising:
generating data for display of a user interface element, the user interface element enabling selection of one or more layers of supplementary content;
receiving a first input, via the user interface element, indicating selection of the first layer of supplementary content;
activating the first layer of supplementary content based at least partly on the first input; and
maintaining activation of the first layer of supplementary content while a plurality of pages of the electronic book are displayed.

13. A method comprising:
under control of one or more processors,
determining that at least a first layer of supplementary content and a second layer of supplementary content are associated with a first location within an electronic book that includes at least a first word;
identifying a conflict between the first layer and the second layer by determining that the first layer and the second layer are associated with the first location;
determining, based at least partly on identifying the conflict, that the first layer represents a higher priority layer than the second layer;
determining a first visual identifier that includes at least a first image associated with the first layer;
determining a second visual identifier that includes at least a second image associated with the second layer;
generating first data for display of an indicator to identify the first layer and the second layer as supplementary content layers, wherein the indicator includes the first image and the second image;
generating second data for display of a portion of the electronic book that includes the first location associated with the conflict; and
based at least partly on determining that the first layer represents the higher priority layer, generating third data for display of the first image at the first location, the third data causing the first image to be displayed at the first location, without the second image, when the first and second layers are active.

14. The method as recited in claim 13, further comprising:
generating data for display of a selectable layer control; and
generating data for display of a layer management experience interface in response to selection of the selectable layer control,
wherein the layer management experience interface includes an identification of a plurality of layers of supplementary content associated with the electronic book, and
wherein individual selectable options associated with individual layers of the plurality of layers are offset from content of the electronic book.

15. The method as recited in claim 14, wherein generating data for display of the layer management experience interface causes display of the individual selectable options to be substantially aligned in a row and offset above or below the content of the electronic book.

16. The method as recited in claim 14, wherein generating data for display of the layer management experience interface causes display of the individual selectable options to be substantially aligned in a column and offset to the left or to the right of the content of the electronic book.

17. The method as recited in claim 14, wherein:
generating data for display of the layer management experience interface further comprises displaying an option to display a third layer of supplementary content associated with the electronic book that represents premium supplementary content that is available for purchase, the third layer representing a higher priority layer than the first layer;
determining a third visual identifier that includes at least a third image associated with the third layer; and
generating data for display of the third image at the first location within the electronic book.

18. A method comprising:
under control of one or more processors,
determining, for a first location within a digital work, that a first layer of supplementary content and a second layer of supplementary content are associated with the first location;
determining that the first layer represents a higher priority layer than the second layer;
determining a first visual identifier that is associated with the first layer;
determining a second visual identifier that is associated with the second layer;
generating first data for display of a portion of the digital work that includes the first location associated with the first and second layers; and
based at least partly on determining that the first layer represents the higher priority layer, generating second data for display of the first visual identifier at the first location, the second data causing the first visual identifier to be displayed at the first location, without the second visual identifier, when the first and second layers are active.

19. The method as in claim 18, further comprising:
generating data for display of a selectable layer control in association with the digital work;
generating data for display of a layer management experience interface that includes an identification of a plurality of layers of supplementary content associated with the digital work;
receiving, via the layer management experience interface, a selection of at least one layer of supplementary content of the plurality of layers of supplementary content;
generating data for display of a visual indicator that includes an indication that the at least one layer of supplementary content has been selected; and
displaying content, of the at least one layer of supplementary content, while a plurality of pages of the digital work are displayed.

20. The method as in claim 19, wherein generating data for display of the layer management experience further includes displaying a selectable option to purchase another layer of premium supplementary content that is associated with the digital work.

* * * * *